United States Patent
Kimura

(10) Patent No.: US 7,133,332 B2
(45) Date of Patent: Nov. 7, 2006

(54) LIGHT CONVERGING APPARATUS WITH ABERRATION CORRECTING ELEMENT WITH PARAXIAL POWER WHICH HAS TEMPERATURE DEPENDENCY

(75) Inventor: Tohru Kimura, Hachioji (JP)

(73) Assignee: Konica Corporation, Tokyo (JP)

( * ) Notice: Subject to any disclaimer, the term of this patent is extended or adjusted under 35 U.S.C. 154(b) by 797 days.

(21) Appl. No.: 10/346,782

(22) Filed: Jan. 17, 2003

(65) Prior Publication Data

US 2003/0142229 A1    Jul. 31, 2003

(30) Foreign Application Priority Data

Jan. 22, 2002  (JP)  ............................. 2002-012487
Jul. 24, 2002  (JP)  ............................. 2002-214798

(51) Int. Cl.
*G11B 7/00*    (2006.01)

(52) U.S. Cl. ............................. 369/44.32; 369/112.03; 359/197

(58) Field of Classification Search ............. 369/44.32, 369/112.03; 359/197
See application file for complete search history.

(56) References Cited

U.S. PATENT DOCUMENTS 5,568,197 A  * 10/1996  Hamano ..................... 348/342
5,838,480 A  * 11/1998  McIntyre et al. ........... 359/205
6,366,542 B1 *  4/2002  Kojima et al. ........... 369/44.23

FOREIGN PATENT DOCUMENTS

| JP | 2001-324673 | 11/2001 |
|----|-------------|---------|
| JP | 2002-082280 | 3/2002 |
| JP | 2002-236252 | 8/2002 |

* cited by examiner

*Primary Examiner*—Gautam R. Patel
(74) *Attorney, Agent, or Firm*—Cohen, Pontani, Lieberman & Pavane

(57) ABSTRACT

A light-converging optical system has an objective lens arranged at a position to be opposite to an optical information recording medium and including at least one plastic lens, and an aberration correcting element provided on an optical path between the light source and the objective lens and structured by two groups of a positive lens and a negative lens both being a plastic lens. At least one of the positive lens and the negative lens has at least one diffractive surface on which a diffractive structure is formed and a total paraxial power of the aberration correcting element has a temperature dependency satisfying a formula of:

$P_{T1} < P_{T0} < P_{T2}$, or $P_{T1} > P_{T0} > P_{T2}$, where $P_{T0}$, $P_{T1}$ and $P_{T2}$ are the total paraxial power ($mm^{-1}$) of the aberration correcting element under the temperature of 25° C., −5° C. and 55° C. respectively.

28 Claims, 13 Drawing Sheets

SPHERICAL ABERRATION
AXIAL CHROMATIC ABERRATION

SPHERICAL ABERRATION
AXIAL CHROMATIC ABERRATION

SPHERICAL ABERRATION
AXIAL CHROMATIC ABERRATION

LIGHT CONVERGING APPARATUS WITH ABERRATION CORRECTING ELEMENT WITH PARAXIAL POWER WHICH HAS TEMPERATURE DEPENDENCY

BACKGROUND OF THE INVENTION

The present invention relates to a light-converging optical system for at least one of recording and reproducing for an optical information recording medium, an optical pick-up device, a recording/reproducing apparatus, an aberration correction element and an objective lens.

Heretofore, an optical disk has been used widely for accumulation of music information and image information and for storage of digital data such as storage of computer data. In recent years, there has been a strong demand for a large capacity of the optical disk, with the incoming of information age, and there has been commercialized DVD (digital versatile disk) wherein recording capacity (recording density) per unit area is enhanced to seven times that of the disk in the same size as CD (compact disk).

In the optical disk, it is possible to realize improvement of recording density, by making a spot diameter obtained from an optical pickup optical system to be small. Since the smallest diameter of the spot is proportional to $\lambda$/NA ($\lambda$ represents a wavelength of a light source, and NA represents the numerical aperture of the optical system, in this case), a short wavelength of a light source used in the optical pickup device and a high numerical aperture of an objective lens arranged to face an optical information recording medium in the optical system, are effective for making the spot diameter to be small.

Among the foregoing, with respect to the short wavelength of the light source, a violet semiconductor laser and an SHG violet laser which emit light with a wavelength of about 400 nm seem to be put to practical use in the near future, because researches of them have been advanced. If these short wavelength light sources are used, information of about 15 GB can be recorded for the optical disk having a diameter of 12 cm which is the same as that of DVD, even when using an objective lens having NA of 0.65 which is the same as that of DVD.

Further, with respect to the high numerical aperture of an objective lens, there have been advanced researches of an objective lens that is composed of one or two lenses and has a high numerical aperture of NA 0.85. By using a combination of the aforesaid short wavelength light source and an objective lens with high numerical aperture of NA 0.85, information of about 25 GB can be recorded for the optical disk having a diameter of 12 cm, which makes it possible to attain the higher density.

With the background like this, each company is buckling down to research and development for high density and advanced optical disks each employing a violet light source having a short wavelength and a high numerical aperture objective lens (hereinafter referred to as "high density DVD" in the present specification).

Incidentally, in the optical pickup device, plastic lenses are used as an objective lens in large quantities, because they are advantageous for mass production. However, it is known that the refractive index of the plastic lens changed by temperature changes is greater than that of a glass lens by magnifying power of a two-digit number.

If an ambient temperature for the objective lens made by plastic materials rises to change the refractive index of the objective lens, spherical aberration of the objective lens is deteriorated. Since an amount of the deterioration of the spherical aberration caused by the change of the refractive index is in proportion to the fourth power of the numerical aperture of the objective lens, the spherical aberration is deteriorated more by the change of the refractive index when an objective lens with numerical aperture 0.85 used for high density DVD is made to be a plastic lens.

Though the inventors of the invention have proposed a plastic lens with the structure of one element in one group as disclosed in TOKUGAN No. 2001-324673 and a plastic lens with the structure of two elements in two groups as disclosed in TOKKAI No. 2001-256422, as a plastic objective lens to be used for high density DVD, these objective lens each having a numerical aperture of 0.85 have a problem in practical use that a range of usable temperatures is extremely narrow for the aforementioned reason.

Explanation will be given as follows, with some examples. FIG. 1 shows how the spherical aberration component of wave-front aberration is changed by the temperature change, in the plastic lenses with the structure of one element in one group and two elements in two groups. They have focal length of 1.76 mm, and standard designed wavelength of 405 nm, and standard designed temperature 25° C. In order for information to be capable of being recorded and reproduced for an optical disk in the optical pickup device, it is necessary that the total power of the optical pickup optical system satisfies Marechal's criterion (wavefront aberration is 0.07 $\lambda$ rms or less when a wavelength is represented by $\lambda$). In the actual optical pick-up optical system, there are included optical elements other than the objective lens such as a collimator and a prism, thus, the upper limit of the power (residual wave-front aberration) allowed for the objective lens is about 0.03 $\lambda$ rms. From FIG. 1, in the case of the objective lens with the structure of one element in one group, 0.03 $\lambda$ rms is exceeded by the change of temperature of about +10° C. On the other hand, in the case of the objective lens with the structure of two elements in two groups, its deterioration is not so remarkable as in the objective lens with the structure of one element in one group, 0.03 $\lambda$ rms is exceeded for 85° C. that is the temperature that secures operations of the optical disk player. Therefore, for using a plastic lens with a high numerical aperture as an objective lens for optical pickup use that is carried in an optical disk player for high density DVD, some devices are needed.

The inventors of the invention have proposed an optical pickup device for a high density optical disk which is equipped with a light source and an objective lens having therein at least one plastic lens wherein a beam expander of a two-group structure representing an aberration correction element is provided between the light source and the objective lens (TOKKAI No. 2002-82280). Owing to this optical pickup device, spherical aberration that is deteriorated when the ambient temperature rises and the refractive index of the plastic lens included in the objective lens is changed can be corrected by adjusting the distance between lenses of the beam expander, which makes it possible to use a plastic lens having a high numerical aperture as an objective lens for the optical pickup device.

In the optical pickup device, however, there have been problems that manufacturing cost is increased by an increase in the number of parts of the optical pickup device and the optical pickup device needs to be large in size, because a spherical aberration detection means for detecting the change of spherical aberration of a plastic lens caused by the change in ambient temperature and an actuator for adjusting the lens distance of a beam expander based on results of the detection, are needed.

Incidentally, when a violet semiconductor laser that emits light with a short wavelength of about 400 nm is used as a light source, chromatic aberration caused on an objective lens brings about a problem. In the optical pickup device, a laser beam emitted from a semiconductor laser is generally of a single wavelength (single mode), and therefore, chromatic aberration on the objective lens is considered not to be a problem. Actually, however, temperature changes or output changes cause mode hopping wherein a central wavelength changes instantaneously by several nm. Since the mode hopping is an instantaneous wavelength change that cannot be followed by the focusing mechanism of the objective lens, if chromatic aberration of the objective lens is not corrected, defocus component corresponding to an amount of movement of best focus position is added, and light-converging power of the objective lens is deteriorated.

Since dispersion of general lens materials used for an objective lens is not so great in 600 nm to 800 nm representing a wavelength area of an infrared semiconductor laser or a red semiconductor laser, deterioration of light-converging power of an objective lens caused by mode hopping was not a problem.

However, in the vicinity of 400 nm that is a wavelength area of a violet semiconductor laser, dispersion of lens materials becomes extremely great. Therefore, even a wavelength change of only several nm can cause best focus position of an objective lens to be shifted greatly. In high density DVD, therefore, when mode hopping is caused on a semiconductor laser light source, light-converging power of an objective lens is deteriorated greatly, resulting in a fear that recording and reproducing cannot be conducted stably.

FIG. 2 is a diagram showing changes of wave-front aberration including defocus component of an objective lens on the occasion where a wavelength of light entering the objective lens is changed from standard designed wavelength (405 nm) with respect to the aforesaid two plastic lenses. Though it is considered that a wavelength of a violet semiconductor laser is changed by mode hopping by about 1 nm, FIG. 2 shows that the wave-front aberration including defocus component in the case of a change of a wavelength by 1 nm exceeds 0.03 λ rms for the two lenses. In the optical pickup device for a high density optical disk, therefore, even in the case that mode hopping is caused on a violet semiconductor laser light source, light-converging power is less deteriorated and recording and reproducing can be conducted stably, thus, it can be said that chromatic aberration of the objective lens needs to be corrected.

SUMMARY OF THE INVENTION

The invention has been achieved in view of the situations mentioned above, and its object is to provide a light-converging optical system for high density DVD wherein there is provided an aberration correction element that can control a change of spherical aberration of a high NA plastic objective lens caused by temperature changes to be small, with a relatively simple structure.

Further object of the invention is to provide a light-converging optical system equipped with an aberration correction element that can control chromatic aberration caused on the objective lens to be small, when a light source whose oscillation wavelength changes instantaneously like a semiconductor laser is used.

Then, the object of the invention is to provide an optical pickup device equipped with the aforesaid light-converging optical systems, and to provide a recording and reproducing apparatus equipped with the aforesaid optical pickup device.

Further, the object is to provide an aberration correction element capable of being applied to an optical pickup device for high density DVD equipped with a high NA plastic objective lens, wherein a change of spherical aberration of the high NA plastic objective lens caused by temperature changes can be controlled to be small with a relatively simple structure. Further object of the invention is to provide an aberration correction element that can control chromatic aberration caused on the objective lens to be small, when a light source whose oscillation wavelength changes instantaneously like a semiconductor laser is used. Further object is to provide an objective lens which can be used for the light-converging optical system.

For attaining the objects stated above, the first light-converging optical system of the invention is a light-converging optical system for recording and/or reproducing for an optical information recording medium for converging a light flux emitted from the light source on the information recording surface of an optical information recording medium, and the light-converging optical system has therein an objective lens that is arranged at the position facing the optical information recording medium and has at least one plastic lens, and an aberration correction element that is arranged in the optical path between the light source and the objective lens, and is composed of two groups including a positive lens and a negative lens both representing a plastic lens, and at least one of the positive lens and the negative lens has at least one diffractive surface on which a diffractive structure is formed, and the total paraxial power of the aberration correction element has temperature dependency that satisfies the following expressions (1) and (2);

$$P_{T1} < P_{T0} < P_{T2} \quad (1)$$

$$P_{T1} > P_{T0} > P_{T2} \quad (2)$$

wherein, $P_{T0}$ is the total paraxial power ($mm^{-1}$) of the aberration correction element at 25° C., $P_{T1}$ is the total paraxial power ($mm^{-1}$) of the aberration correction element at −5° C., and $P_{T2}$ is the total paraxial power ($mm^{-1}$) of the aberration correction element at 55° C.

The second light-converging optical system of the invention is a light-converging optical system for recording and/or reproducing for an optical information recording medium for converging a light flux emitted from the light source on the information recording surface of an optical information recording medium, and the light-converging optical system has therein an objective lens that is arranged at the position facing the optical information recording medium and has at least one plastic lens, and an aberration correction element that is arranged in the optical path between the light source and the objective lens, and the aberration correction element is composed of two groups including a positive lens and a negative lens wherein either one is a plastic lens and the other is a glass lens, and the total paraxial power of the aberration correction element has temperature dependency that satisfies the following expressions (1) and (2);

$$P_{T1} < P_{T0} < P_{T2} \quad (1)$$

$$P_{T1} > P_{T0} > P_{T2} \quad (2)$$

wherein, $P_{T0}$ is the total paraxial power (mm$^{-1}$) of the aberration correction element at 25° C., $P_{T1}$ is the total paraxial power (mm$^{-1}$) of the aberration correction element at −5° C., and $P_{T2}$ is the total paraxial power (mm$^{-1}$) of the aberration correction element at 55° C.

In the first or second light-converging optical system stated above, when the aforementioned aberration correction element satisfies the above expression (1), the sum total of refracting power of all plastic lenses included in the aberration correction element is represented by $P_R$, the third degree spherical aberration component of the residual aberration of the objective lens at 55° C. is represented by $3SA_{OBJ}(55°\ C.)$, and the third degree spherical aberration component of the residual aberration of the objective lens at 25° C. is represented by $3SA_{OBJ}(25°\ C.)$, it is preferable that the objective lens satisfies the following expressions (3) and (4);

$$P_R<0 \tag{3}$$

$$3SA_{OBJ}(55°\ C.)-3SA_{OBJ}(25°\ C.)<0 \tag{4}$$

wherein it is defined that a sign of the third degree spherical aberration component in the over correction is "+", and a sign of the third degree spherical aberration component in the under correction is "−".

In this case, it is preferable that the aforementioned objective lens is an objective lens having a two-group and two-element structure wherein a first lens having positive refracting power and a second lens having positive refracting power are arranged in this order from the light source side, and at least one lens including the first lens is a plastic lens.

Further, it is preferable that a plastic lens included in the aberration correction element has at least one diffractive surface on which the diffractive structure is formed, and the plastic lens satisfies the following expression (5);

$$P_D>0 \tag{5}$$

wherein, $P_D$ is the sum total (mm$^{-1}$) of diffracting power defined by $$P_D=\Sigma(-2\cdot n\cdot b2) \tag{7}$$

when an optical path difference added to the wave-front that has passed through the diffractive structure is indicated with an optical path difference function defined by $$\Phi_b=n\cdot(b_2\cdot h^2+b_4\cdot h^4+b_6\cdot h^6+\ldots) \tag{6}$$

(here, n represents a degree of a diffracted light having the maximum amount of diffracted light among those generated by the diffractive structure, h represents a height (mm) from the optical axis, and $b_2$, $b_4$, $b_6$ . . . represent respectively coefficients of optical path difference function (called also as coefficients of diffractive surface) for the second, fourth, sixth, . . . ).

In the first or second light-converging optical system stated above, when the aforementioned aberration correction element satisfies the above expression (2), the sum total of refracting power of all plastic lenses included in the aberration correction element is represented by $P_R$, the third degree spherical aberration component of the residual aberration of the objective lens at 55° C. is represented by $3SA_{OBJ}(55°\ C.)$, and the third degree spherical aberration component of the residual aberration of the objective lens at 25° C. is represented by $3SA_{OBJ}(25°\ C.)$, it is preferable that the objective lens satisfies the following expressions (8) and (9);

$$P_R>0 \tag{8}$$

$$3SA_{OBJ}(55°\ C.)-3SA_{OBJ}(25°\ C.)>0 \tag{9}$$

wherein it is defined that a sign of the third degree spherical aberration component in the over correction is "+", and a sign of the third degree spherical aberration component in the under correction is "−".

In this case, it is preferable that the objective lens is a plastic lens having a one-group and one-element structure. It is further preferable that the plastic lens included in the aberration correction element has at least one diffractive surface on which the diffractive structure is formed, and it satisfies the following expression (10);

$$P_D<0 \tag{10}$$

wherein, $P_D$ is the sum total (mm$^{-1}$) of diffracting power defined by $$P_D=\Sigma(-2\cdot n\cdot b2) \tag{7}$$

when an optical path difference added to the wave-front that has passed through the diffractive structure is indicated with an optical path difference function defined by $$\Phi_b=n\cdot(b_2\cdot h^2+b_4\cdot h^4+b_6\cdot h^6+\ldots) \tag{6}$$

(here, n represents a degree of a diffracted light having the maximum amount of diffracted light among those generated by the diffractive structure, h represents a height (mm) from the optical axis, and $b_2$, $b_4$, $b_6$ . . . represent respectively coefficients of optical path difference function (called also as coefficients of diffractive surface) for the second, fourth, sixth, . . . ).

The third light-converging optical system of the invention is a light-converging optical system for recording and/or reproducing for an optical information recording medium for converging a light flux emitted from the light source on the information recording surface of an optical information recording medium, and the light-converging optical system has therein an objective lens that is arranged at the position facing the optical information recording medium and has at least one plastic lens, and an aberration correction element that is arranged in the optical path between the light source and the objective lens and is composed of two groups including a positive lens and a negative lens both representing a plastic lens, and at least one of the positive lens and the negative lens has at least one diffractive surface on which a diffractive structure is formed and satisfies the following expressions (5), (11) and (2);

$$P_D>0 \tag{5}$$

$$\Delta 3SA_{OBJ}/\Delta T_{OBJ}<0 \tag{11}$$

$$P_{\lambda 1}<P_{\lambda 0}<P_{\lambda 2} \tag{12}$$

wherein, $P_D$ is the sum total (mm$^{-1}$) of diffracting power defined by $$P_D=\Sigma(-2\cdot n\cdot b2) \tag{7}$$

when an optical path difference added to the wave-front that has passed through the diffractive structure is indicated with an optical path difference function defined by $$\Phi_b=n\cdot(b_2\cdot h^2+b_4\cdot h^4+b_6\cdot h^6+\ldots) \tag{6}$$

(here, n represents a degree of a diffracted light having the maximum amount of diffracted light among those generated by the diffractive structure, h represents a height (mm) from the optical axis, and $b_2$, $b_4$, $b_6$ ... represent respectively coefficients of optical path difference function (called also as coefficients of diffractive surface) for the second, fourth, sixth, ...). $\Delta T_{OBJ}$ represents an amount of changes of ambient temperatures for the objective lens. $\Delta 3SA_{OBJ}$ represents an amount of changes of third degree spherical aberration components in the case of development of the residual aberration of the objective lens into a Zernike's polynomial expression, when the refractive index of at least one plastic lens among plastic lenses included in the objective lens is changed by the change of ambient temperature for the objective lens $\Delta T_{OBJ}$, and its sign is defined to be "+" when the third degree spherical aberration component changes in the direction of over correction, and its sign is defined to be "−" when the third degree spherical aberration component changes in the direction of under correction. $P_{\lambda 0}$ represents the total paraxial power (mm$_{-1}$) of the aberration correction element in the wavelength of light emitted from the light source. $P_{\lambda 1}$ represents the total paraxial power (mm$_{-1}$) of the aberration correction element in the wavelength that is shorter by 10 nm than that of light emitted from the light source. $P_{\lambda 2}$ represents the total paraxial power (mm$_{-1}$) of the aberration correction element in the wavelength that is longer by 10 nm than that of light emitted from the light source.

In the third light-converging optical system, it is preferable that the objective lens is one having a two-group and two-element structure wherein a first lens having positive refracting power and a second lens having positive refracting power are arranged in this order from the light source side, and at least one lens including the first lens is a plastic lens. In this case, it is preferable that the following expressions (13), (3),(14) and (15) are satisfied;

$$1.0 \times 10^{-2} < P_D < 10.0 \times 10^{-2} \tag{13}$$

$$P_R < 0 \tag{3}$$

$$-30.0 \times 10^{-4} < \Delta 3SA_{OBJ}/(\Delta T_{OBJ} \cdot NA^4 \cdot f_{OBJ}) < 0 \tag{14}$$

$$0.5 \times 10^{-3} < \Delta fB_{OBJ}/f_{OBJ} < 2.5 \times 10^{-3} \tag{15}$$

wherein, $P_R$ represents the sum total of refracting power of all plastic lenses included in the aberration correction element.

NA represents the prescribed an image-side numerical aperture of the objective lens that is necessary for recording and/or reproducing for the optical information recording medium.

The symbol $f_{OBJ}$ represents a focal length (mm) of the objective lens.

$\Delta fB_{OBJ}$ represents axial chromatic aberration (mm) in the case where light having a wavelength that is longer by 10 nm than that of light emitted from the light source enters the objective lens.

The fourth light-converging optical system of the invention is a light-converging optical system for recording and/or reproducing for an optical information recording medium for converging a light flux emitted from the light source on the information recording surface of an optical information recording medium, and the light-converging optical system has therein an objective lens that is arranged at the position facing the optical information recording medium and has at least one plastic lens, and an aberration correction element that is arranged in the optical path between the light source and the objective lens and is composed of two groups including a positive lens and a negative lens wherein at least one is a plastic lens, and the plastic lens among the positive lens and the negative lens has at least one diffractive surface on which the diffractive structure is formed, and the light-converging optical system corrects the change of spherical aberration on the objective lens caused by the change of the refractive index of at least one plastic lens among plastic lenses included in the objective lens, the change of the refractive index being caused by the change of ambient temperature for the light-converging optical system, with the change of the degree of divergence of the light flux emerging from the aberration correction element generated by the change of the refractive index of the plastic lens of the aberration correction element, the change of the refractive index being caused by the change of the ambient temperature, and satisfies the following expression (12);

$$P_{\lambda 1} < P_{\lambda 0} < P_{\lambda 2} \tag{12}$$

wherein, $P_{\lambda 0}$ represents the total paraxial power (mm$^{-1}$) of the aberration correction element in the wavelength of light emitted from the light source.

$P_{\lambda 1}$ represents the total paraxial power (mm$^{-1}$) of the aberration correction element in the wavelength that is shorter by 10 nm than that of light emitted from the light source.

$P_{\lambda 2}$ represents the total paraxial power (mm$^{-1}$) of the aberration correction element in the wavelength that is longer by 10 nm than that of light emitted from the light source.

In the fourth light-converging optical system stated above, it is preferable that the positive lens of the aberration correction element is a plastic lens, and it satisfies the following expressions (16) and (8);

$$\Delta 3SA_{OBJ}/\Delta T_{OBJ} > 0 \tag{16}$$

$$P_R > 0 \tag{8}$$

wherein, $\Delta 3SA_{OBJ}$ represents an amount of changes of third degree spherical aberration components in the case of development of the residual aberration of the objective lens into a Zernike's polynomial expression, when the refractive index of at least one plastic lens among plastic lenses included in the objective lens is changed by the change of ambient temperature for the objective lens $\Delta T_{OBJ}$, and its sign is defined to be "+" when the third degree spherical aberration component changes in the direction of over correction, and its sign is "−" when the third degree spherical aberration component changes in the direction of under correction.

$\Delta T_{OBJ}$ represents an amount of changes of ambient temperatures for the objective lens.

$P_R$ represents the sum total of refracting power of all plastic lenses included in the aberration correction element.

In this case, it is preferable that the objective lens is a plastic lens of a one-group and one-element structure.

It is further preferable that the negative lens of the aberration correction element is a plastic lens and it satisfies the following expressions (17) and (3);

$$\Delta 3SA_{OBJ}/\Delta T_{OBJ} < 0 \tag{17}$$

$$P_R < 0 \tag{3}$$

wherein, $\Delta 3SA_{OBJ}$ represents an amount of changes of third degree spherical aberration components in the case of development of the residual aberration of the objective lens into a Zernike's polynomial expression, when the refractive index of at least one plastic lens among plastic lenses included in the objective lens is changed by the change of ambient temperature for the objective lens $\Delta T_{OBJ}$, and its sign is defined to be "+" when the third degree spherical aberration component changes in the direction of over correction, and its sign is defined to be "−" when the third degree spherical aberration component changes in the direction of under correction.

$\Delta T_{OBJ}$ represents an amount of changes of ambient temperatures for the objective lens.

$P_R$ represents the sum total of refracting power of all plastic lenses included in the aberration correction element.

In this case, it is preferable that the aforementioned objective lens is an objective lens having a two-group and two-element structure wherein a first lens having positive refracting power and a second lens having positive refracting power are arranged in this order from the light source side, and at least one lens including the first lens is a plastic lens.

In the aforesaid first to fourth light-converging optical systems, it is preferable that a prescribed image-side numerical aperture of the objective lens necessary for recording and/or reproducing for the optical information recording medium is made to be 0.8 or more. It is further preferable that the aforementioned light source emits light with a wavelength of 550 nm or less. Further, it is preferable that the objective lens satisfies the following expression (18), and it is more preferable to satisfy the following expression (19);

$$|\Delta 3SA_{OBJ}|/|\Delta 5SA_{OBJ}|>1 \quad (18)$$

$$|\Delta 3SA_{OBJ}|/|\Delta 5SA_{OBJ}|>3 \quad (19)$$

wherein, $\Delta 5SA_{OBJ}$ is an amount of changes of the fifth degree spherical aberration component in the case of development of the aberration of the objective lens into a Zernike's polynomial expression, when the change $\Delta T_{OBJ}$ of the ambient temperature for the objective lens makes the refractive index of a plastic lens of the objective lens to change by an amount of change $\Delta N_{OBJ}$.

The optical pickup device of the invention is an optical pickup device for recording and/or reproducing for an optical information recording medium having a light source and a light-converging optical system for converging a light flux emitted from the light source on an information recording surface of the optical information recording medium, wherein the light-converging optical system is represented by the aforementioned first through fourth light-converging optical systems.

It is preferable that the optical pickup device has an actuator for adjusting variably a distance between at least two lenses among those included in the aberration correction element, and it makes spherical aberration generated on each optical surface of the light-converging optical system to be small by adjusting variably the distance with the actuator.

The recording/reproducing apparatus of the invention may further be structured so that the optical pick-up device may be provided, sounds and/or images may be recorded, and/or sounds and/or images may be reproduced.

The first aberration correction element of the invention is an aberration correction element arranged in the optical path between a light source and an objective lens wherein a first lens having positive refracting power and a second lens having positive refracting power are arranged in this order from the light source side to form a two-group and two-element structure, and at least one lens including the first lens is a plastic lens, and the aberration correction element has a positive lens and a negative lens both representing a plastic lens, and at least one of the positive lens and the negative lens has at least one diffractive surface on which the diffractive structure is formed, and it satisfies the following expressions (20) and (12);

$$\Delta\theta/\Delta T_{AC}>0 \quad (20)$$

$$P_{\lambda 1}<P_{\lambda 0}<P_{\lambda 2} \quad (12)$$

wherein, $\Delta\theta$ is an amount of change in an inclination angle of marginal ray of light of a light flux emerging from the aberration correction element in the case of a change of an ambient temperature for the aberration correction element by $\Delta T_{AC}$, and it sign is defined to be "+" when the inclination angle changes in the clockwise direction with an optical axis serving as a reference, while, it is defined to be "−" when changing in the counterclockwise direction.

$P_{\lambda 0}$ is the total paraxial power (mm$^{-1}$) of the aberration correction element in the wavelength of light emitted from the light source.

$P_{\lambda 1}$ is the total paraxial power (mm$^{-1}$) of the aberration correction element in the wavelength which is shorter by 10 nm than that of the light emitted from the light source.

$P_{\lambda 2}$ is the total paraxial power (mm$^{-1}$) of the aberration correction element in the wavelength which is longer by 10 nm than that of the light emitted from the light source.

The second aberration correction element of the invention is an aberration correction element arranged in the optical path between the light source and the objective lens having at least one plastic lens, and the second aberration correction element has a positive lens and a negative lens, and has temperature dependency wherein the total paraxial power satisfies the following expressions (1) and (2);

$$P_{T1}<P_{T0}<P_{T2} \quad (1)$$

$$P_{T1}>P_{T0}>P_{T2} \quad (2)$$

wherein, $P_{T0}$ represents the total paraxial power (mm$^{-1}$) of the aberration correction element at 25° C., $P_{T1}$ represents the total paraxial power (mm$^{-1}$) of the aberration correction element at −5° C. and $P_{T2}$ represents the total paraxial power (mm$^{-1}$) of the aberration correction element at 55° C.

In the aforesaid first or second aberration correction element, it is preferable that each of the positive lens and the negative lens stated above is a plastic lens, and at least one of the positive lens and the negative lens has at least one diffractive surface on which the diffractive structure is formed. With respect to the positive lens and the negative lens, it is preferable that either one of them is a plastic lens and the other is a glass lens.

The objective lens of the invention is characterized to be an objective lens used in each of the first to fourth light-converging optical systems and to satisfy the following expression (21);

$$|\Delta 3SA_{OBJ}|/|\Delta 5SA_{OBJ}|>3 \quad (21)$$

wherein, $\Delta 3SA_{OBJ}$ is an amount of changes of the third degree spherical aberration component in the case of development of the residual aberration of the objective lens into a Zernike's polynomial expression, when the change $\Delta T_{OBJ}$ of the ambient temperature for the objective lens makes the refractive index of at least one plastic lens among plastic lenses included in the objective lens to change, and its sign is defined to be "+" when the third degree spherical aberration component changes toward the over-correction, and to be "−" when the third degree spherical aberration component changes toward the under-correction.

$\Delta 5SA_{OBJ}$ is an amount of changes of the fifth degree spherical aberration component in the case of development of the residual aberration of the objective lens into a Zernike's polynomial expression, when the change $\Delta T_{OBJ}$ of the ambient temperature for the objective lens makes the refractive index of at least one plastic lens among plastic lenses included in the objective lens to change.

(Effect)

Principles for correction of changes in spherical aberration of the objective lens which are caused when temperatures change in each of the first to fourth light-converging optical systems of the invention, will be explained as follows.

A plastic lens has characteristics wherein a refractive index of the plastic lens changes to be smaller when a temperature rises and to be larger when a temperature falls, and this change of the refractive index changes spherical aberration. This change of spherical aberration takes a direction toward under correction or a direction toward over correction, depending on the constituent number of lenses of the plastic lens or on the paraxial power distribution.

On the other hand, when an image forming magnification of the objective lens is made to be large, namely, when a divergent angle of a light flux entering the objective lens is made to be small, spherical aberration in the direction toward over correction can be generated, while, when an image forming magnification of the objective lens is made to be small, namely, when a divergent angle of a light flux entering the objective lens is made to be large, spherical aberration in the direction toward under correction can be generated.

Therefore, it is possible to make the spherical aberration change caused by the change of a refractive index and the spherical aberration change caused by the change of an image forming magnification to cancel each other, by making the degree of divergence of a light flux entering the objective lens to be large, for the objective lens having temperature dependency to change spherical aberration in the direction toward under correction when a temperature rises, and to make the spherical aberration change caused by the change of a refractive index and the spherical aberration change caused by the change of an image forming magnification to cancel each other, by making the degree of divergence of a light flux entering the objective lens to be small, for the objective lens having temperature dependency to change spherical aberration in the direction toward over correction when a temperature rises.

The aberration correction element of the first light-converging optical system of the invention has a plastic positive lens and a plastic negative lens, and either one of them is made to be a diffractive lens.

When both of the plastic positive lens and the plastic negative lens of the aberration correction element are represented by a refraction lens, converging power of the positive lens for a light flux is weak and diverging power of the negative lens for a light flux is weak, when the temperature rise makes the refractive index to be small. Therefore, there hardly is a difference between the degrees of divergence of a light flux emerging from the aberration correction element, namely, between the image forming magnifications of the objective lens, before and after the temperature change.

Therefore, at least one of the plastic positive lens and the plastic negative lens was made to be a diffractive lens on which a diffractive structure is formed, so that the change of the degree of divergence of a light flux emerging from the aberration correction element caused by the temperature change may be selected freely. In this case, distribution between the diffracting power and the sum total of refracting power of plastic lenses was made to be optimum so that temperature dependency wherein the total paraxial power of the aberration correction element satisfies expression (1) or (2) may be provided. Therefore, the change of spherical aberration of the objective lens caused by the temperature change and the change of spherical aberration of the objective lens caused by the change of the degree of divergence of a light flux emerging from the aberration correction element (namely, the change of image forming magnification of the objective lens) can cancel each other.

Further, the aberration correction element of the second light-converging optical system of the invention is composed of a positive lens and a negative lens, either one of which is a glass lens and the other is a plastic lens.

Since the change of the refractive index caused by a coefficient of linear expansion of a glass lens and by a temperature change is smaller than that of a plastic lens by magnifying power of a one-digit number, the change of paraxial power of a glass lens caused by the temperature change is negligible small, compared with the change of paraxial power of a plastic lens. Therefore, as in the aberration correction element of the second light-converging element, it is possible to select the change of the degree of divergence of a light flux emerging from the aberration correction element caused by the temperature change, by structuring the aberration correction element with a positive lens and a negative lens, either one of which is a glass lens and the other is a plastic lens. In this case, a ratio of the paraxial power of the glass lens to that of the plastic lens was made to be optimum so that temperature dependency wherein the total paraxial power of the aberration correction element satisfies expression (1) or (2) may be provided. Therefore, the change of spherical aberration of the objective lens caused by the temperature change and the change of spherical aberration of the objective lens caused by the change of the degree of divergence of a light flux emerging from the aberration correction element (namely, the change of image forming magnification of the objective lens) can cancel each other.

Further, when the objective lens has temperature dependency wherein spherical aberration changes in the direction toward under correction when temperature rises as shown in expression (4), it is preferable to determine the distribution between the diffracting power and sum total of refracting power of plastic lenses so that the sum total of refracting power of all plastic lenses included in the aberration correction element may satisfy expression (3), in the first light-converging optical system, and it is preferable to determine the distribution with the sum total of the paraxial power of the glass lens and plastic lenses so that the sum total of refracting power of all plastic lenses included in the aberration correction element may satisfy expression (3), in the second light-converging optical system.

An objective lens having the temperature dependency wherein spherical aberration changes in the direction toward under correction when temperature rises, namely, the temperature dependency that satisfies expression (3), is an objective lens that is of a two-group and two-element structure wherein a first lens having positive refracting power and a second lens having positive refracting power are arranged, and at least one lens including the first lens among the first and second lenses, is a plastic lens. From the viewpoint of low cost and light weight, it is preferable that each of the first lens and the second lens is a plastic lens.

When the objective lens of each of the first and second light-converging optical systems of the invention has temperature dependency that satisfies expression (3), it is preferable that a plastic lens included in an aberration correction element has at least one diffractive surface on which a diffractive structure having diffractive power satisfying expression (5) is formed. Hereby, it is easy to optimize a change of the degree of divergence of a light flux emerging from the aberration correction element, for the change of spherical aberration of the objective lens caused by temperature changes, thereby, it is possible to correct effectively the change of spherical aberration of the objective lens caused by temperature changes.

On the other hand, when the objective lens has temperature dependency wherein spherical aberration changes in the direction toward over correction in the case of temperature rise as in expression (9), it is preferable to determine the distribution of diffracting power and the sum total of refracting power of plastic lenses, so that the sum total of refracting power of all plastic lenses included in the aberration correction element may satisfy expression (8), in the first light-converging optical system, and it is preferable to determine the distribution with the sum total of paraxial power of a glass lens and plastic lenses so that the sum total of refracting power of all plastic lenses included in the aberration correction element may satisfy expression (8), in the second light-converging optical system.

As an objective lens having temperature dependency wherein spherical aberration changes in the direction toward over correction in the case of temperature rise, namely, temperature dependency that satisfies expression (9), there is a plastic lens having a one-group and one-element structure.

When the objective lens of each of the first and second light-converging optical systems of the invention has temperature dependency that satisfies expression (9), it is preferable that a plastic lens included in an aberration correction element has at least one diffractive surface on which a diffractive structure having diffracting power that satisfies expression (10). Hereby, it is easy to optimize a change of the degree of divergence of a light flux emerging from the aberration correction element, for the change of spherical aberration of the objective lens caused by temperature changes, thereby, it is possible to correct effectively the change of spherical aberration of the objective lens caused by temperature changes.

Incidentally, in the present specification, the diffracting power of a diffracting structure (or diffracting pattern) is indicated with $-2 \cdot n \cdot b_2$, when an optical path difference added to the wave-front that passes through the diffracting structure (or diffracting pattern) is indicated with the optical path difference function defined by expression (6). In this case, when a diffractive structure (or diffracting pattern) is formed on each of two or more optical surfaces of a certain optical element, the diffracting power of the optical element (as a diffraction lens) is the sum total of diffracting power of respective diffractive structures (or diffracting patterns) as defined by expression (7).

The third and fourth light-converging optical systems of the invention are represented by a light-converging optical system wherein a change of spherical aberration of an objective lens having at least one plastic lens caused by temperature changes can be corrected, and axial chromatic aberration of the objective lens can be corrected.

In the third light-converging optical system of the invention, an aberration correction element including a positive lens and a negative lens both representing a plastic lens is provided in an optical path between a light source and an objective lens having at least one plastic lens, and a diffractive structure having positive diffracting power as in expression (5) is formed on at least one surface of the lens on at least one side among the positive lens and the negative lens. The objective lens of the present light-converging optical system has temperature dependency that satisfies expression (11). The expression (11) means that spherical aberration of the objective lens changes in the direction toward under correction when the refractive index of the plastic lens included in the objective lens changes in the case of a rise of ambient temperature for the objective lens. The objective lens having the temperature dependency of this kind includes an objective having a two-group and two-element structure wherein a lens arranged at least on the light source side is a plastic lens.

As stated above, when both of the plastic positive lens and the plastic negative lens of the aberration correction element are represented by a refraction lens, converging power of the positive lens for a light flux is weak and diverging power of the negative lens for a light flux is weak, when the temperature rise makes the refractive index to be small. Therefore, there hardly is a difference between the degrees of divergence of a light flux emerging from the aberration correction element, namely, between the image forming magnifications of the objective lens, before and after the temperature change.

On the other hand, when a diffractive structure having positive diffracting power (=PD) is formed on the plastic positive lens without changing the paraxial power (=P"CONVEX") of the total plastic positive lens, the refracting power of the plastic positive lens turns out to be the first term in the right side of the following expression (22).

$$P\text{"CONVEX"}=(P\text{"CONVEX"}-P_D)+P_D \quad (22)$$

Since the refracting power of the plastic positive lens becomes smaller by an amount of diffraction power caused by the diffractive structure, from expression (22), the change in the convergence function of a ray of light in the case of a rise of the ambient temperature becomes smaller, compared with an occasion where the plastic positive lens is a refraction lens. Therefore, the inclination angle of an upper marginal ray of light of a flux that emerges from the aberration correction element in the case of a rise of the ambient temperature changes in the direction to become smaller, compared with the moment before the change of the ambient temperature. This corresponds to the change for the image forming magnification of the objective lens to become greater, thus, it is possible to cancel the spherical aberration of the objective lens that changed in the direction of under correction.

On the other hand, when a diffractive structure having positive diffracting power (=$P_D$) is formed on the plastic negative lens without changing the paraxial power (=P"CONCAVE") of the total plastic negative lens, the refracting power of the plastic negative lens turns out to be the first term in the right side of the expression (23).

$$P\text{"CONCAVE"}=(P\text{"CONCAVE"}-P_D)+P_D \quad (23)$$

Since the refracting power of a plastic negative lens becomes greater by an amount of diffraction power caused by the diffractive structure, from expression (23), the change in the divergence function of a ray of light in the case of a rise of the ambient temperature becomes greater, compared with an occasion where the negative lens is a refraction lens. Therefore, the inclination angle of a marginal ray of light of a flux that emerges from the aberration correction element in the case of a rise of the ambient temperature changes in the direction to become smaller, compared with the moment before the change of the ambient temperature. This corresponds to the change for the image forming magnification of the objective lens to become greater, thus, it is possible to cancel the spherical aberration of the objective lens that changed in the direction of under correction.

Further, since a diffractive structure having positive diffracting power as in expression (5) is formed on a plastic lens of this aberration correction element, the total paraxial power of the aberration correction element has wavelength characteristics satisfying expression (12). Hereby, when light having a wavelength that is different from the wavelength of light emitted from the light source by 10 nm enters, chromatic aberration caused on the aberration correction element and chromatic aberration caused on the objective lens are canceled each other, thus, the light convergence spot of light passing through the aberration correction element and the objective lens formed on the information recording surface of the optical information recording medium results in the state where the chromatic aberration is controlled to be small. By combining with the aberration correction element of the present light-converging optical system, it is possible to use as an objective lens for high density DVD, even in the case of an objective lens in which the chromatic aberration is not corrected strictly.

Expressions (3) and (13)–(15) represent the conditions for canceling effectively the change of spherical aberration of an objective lens in the case of ambient temperature changes, and for controlling chromatic aberration of the light convergence spot of light passing through the aberration correction element and the objective lens on the image recording surface of the optical information recording medium to be small sufficiently. It is possible to make a compensation for temperature characteristics of the objective lens to be compatible with a compensation for chromatic aberration, by making the balance of the diffracting power of a diffractive structure formed on a plastic lens of the aberration correction element, the sum total of refracting power of all plastic lenses included in the aberration correction element, an amount of changes of the third degree spherical aberration of the objective lens in the case of ambient temperature change and of chromatic aberration of the objective lens, to satisfy the expressions (3) and (13)–(15).

In the fourth light-converging optical system of the invention, there is provided, in an optical path between a light source and an objective lens having at least one plastic lens, an aberration correction element of a two-group and two-element structure that is composed of a positive lens and a negative lens wherein at least one is a plastic lens, and a diffractive structure is formed on at least one surface of the lens which is a plastic lens among the positive lens and the negative lens.

When the fourth light-converging optical system of the invention is provided with an objective lens having temperature characteristics satisfying expression (16), it is preferable that a positive lens of an aberration correction element is made to be a plastic lens. In this case, by establishing a ratio of the sum total of refracting power of all plastic lenses included in the aberration correction element to the sum total of refracting power of the positive lens and refracting power of all plastic lenses included in the aberration correction element to be appropriate, while satisfying expression (8), and by setting an amount of changes for an inclination angle of a marginal ray of light of a light flux emerging from the aberration correction element caused by temperature changes to be a desired value, it is possible to correct effectively the change of the third degree spherical aberration component of the objective lens caused by temperature changes.

On the other hand, when the fourth light-converging optical system of the invention is provided with an objective lens having temperature characteristics satisfying expression (17), it is preferable that a negative lens of an aberration correction element is made to be a plastic lens. In this case, by establishing a ratio of the sum total of refracting power of all plastic lenses included in the aberration correction element to the sum total of refracting power of the negative lens and refracting power of all plastic lenses included in the aberration correction element to be appropriate, while satisfying expression (3), and by setting an amount of changes for an inclination angle of a marginal ray of light of a light flux emerging from the aberration correction element caused by temperature changes to be a desired value, it is possible to correct effectively the change of the third degree spherical aberration component of the objective lens caused by temperature changes.

Further, since an aberration correction element of a light-converging optical system in the invention has wavelength characteristics satisfying expression (12), it is possible to correct axial chromatic aberration of an objective lens, by the same effect as in the third light-converging optical system.

As stated above, the spherical aberration change of a plastic lens generated by a change of the refractive index caused by temperature changes increases in proportion to the fourth power of the numerical aperture. When the numerical aperture of an objective lens in the light-converging optical system of the invention is made to be 0.8 or more, the effect of correction by an aberration correction element for the spherical aberration change caused by temperature changes grows greater.

When a wavelength to be used for the light-converging optical system of the invention is made to be 550 nm or less, high density recording is made to be possible. However, chromatic aberration that is caused on the objective lens as stated above remains as a problem. In this case, if the aberration correction element of the light-converging optical system of the invention is made to have wavelength characteristics satisfying expression (12), chromatic aberration caused on the aberration correction element and that caused on the objective lens are cancelled each other, and the problem stated above can be solved.

Further, it is preferable that the objective lens of the invention satisfies expression (18). Due to this, it is possible to reduce residual high degree spherical aberration that remains after the third degree spherical aberration change of the objective lens in the case of ambient temperature change has been canceled by the change of the image forming magnification of the objective lens. For attaining the effects mentioned above, it is preferable for the objective lens to have temperature characteristics which satisfy expression (19).

What is preferable as an aberration correction element in the light-converging optical system of the invention is a beam expander or a beam shrinker arranged in the optical path existing between a collimator lens and an objective lens. In the present specification, a beam expander means an optical element that expands a diameter of an incident light flux for emitting, and a beam shrinker means an optical element that shrinks a diameter of an incident light flux for emitting.

As stated above, the first through the fourth light-converging optical systems of the invention makes it possible to correct the spherical aberration change caused by the change of refractive index of the objective lens including a plastic lens without moving the lens of the aberration correction element, as in the optical pickup device described in TOK-KAI No. 2002-82280. It is therefore possible to realize reduction of the number of parts in the optical pickup device that is provided with the light-converging optical system of the invention and reduction of manufacturing cost.

It is preferable that the optical pickup device equipped with each of the first through the fourth light-converging optical systems of the invention has an actuator that adjusts variably a distance between at least two lenses among lenses included in the aberration correction element. Due to this, it is possible to cancel the third degree spherical aberration which changes in the case of layer-to-layer jump, when conducting recording or reproducing for an optical information recording medium that has a plurality of information recording layers on the same incident surface for light flux of a two-layer disk or a three-layer disk. Further, it is possible to compensate the residual third degree spherical aberration component by adjusting a lens distance variably, even in the case where the third degree spherical aberration caused by manufacturing errors or by ambient temperature change remains on the objective lens.

The first aberration correction element of the invention is arranged in an optical path located between a light source and an objective lens wherein a first lens having positive refracting power and a second lens having positive refracting power are arranged in this order from the light source side in the two-group and two-element structure, and at least one lens including the first lens among the first lens and the second lens is made to be a plastic lens. Then, a positive lens and a negative lens both representing a plastic lens are provided, and a diffractive structure is formed on at least one surface of the lens on at least one side of the positive lens and the negative lens. Further, an amount of change of an inclination angle of an upper marginal ray of light of a light flux emerging from the aberration correction element in the case of the change by ΔTAC of ambient temperature for the aberration correction element satisfies expression (20), and the total paraxial power has wavelength characteristics that satisfy expression (12).

The objective lens of a two-group and two-element structure wherein at least one lens including a first lens is a plastic lens has temperature characteristics wherein the third degree spherical aberration component changes in the direction of under correction when ambient temperature rises and refractive index of the plastic lens becomes smaller. An aberration correction element of the invention can cancel the third spherical aberration of the objective lens that has changed in the direction of under correction, because an amount of change of an inclination angle of the upper marginal ray of light of an emerging light flux in the case of a change in ambient temperature satisfies expression (20).

Further, though a positive lens of a refraction type has wavelength characteristics to change in the direction for an image forming position to become longer when a wavelength of incident light changes in the direction to become longer, the total paraxial power of the aberration correction element of the invention has wavelength characteristics satisfying expression (12). It is therefore possible to cancel chromatic aberration caused on the aberration correction element and chromatic aberration caused on the objective lens each other when light having a wavelength which is different from that of light emitted from the light source by 10 nm enters. As a result, the light convergence spot of light passing through the aberration correction element and the objective lens formed on an information recording surface of an optical information recording medium comes to the state wherein chromatic aberration (movement of an image forming position when a wavelength is changed) is controlled to be small. By combining with an aberration correction element of the invention, it is possible to use as an objective lens for high density DVD even in the case of an objective lens wherein chromatic aberration is not corrected strictly.

The second aberration correction element of the invention is an aberration correction element arranged in on optical path located between a light source and an objective lens having at least one plastic lens, and it has a positive lens and a negative lens, and the total paraxial power satisfies expression (1) or (2).

In the concrete structure, the positive lens and the negative lens represent a plastic lens, and at least one of the positive lens and the negative lens is an aberration correction element which is structured to have at least one diffractive surface on which a diffractive structure is formed, or an aberration correction element wherein either one of the positive lens and the negative lens is a plastic lens and the other is a glass lens.

By structuring the second aberration correction element of the invention as described above, the spherical aberration changes caused on the objective lens when temperature changes can be canceled by the actions and effects which are the same as those in the first and second light-converging optical systems of the invention.

Further, the optical pick-up device of the invention stated above can be carried by a player or a drive for an advanced and higher density optical information recording medium, or can be carried by a sound and/or image recording apparatus and/or reproducing apparatus such as AV equipment, a personal computer and other information terminals.

DETAILED DESCRIPTION OF THE PREFERRED EMBODIMENT

Figure 1:
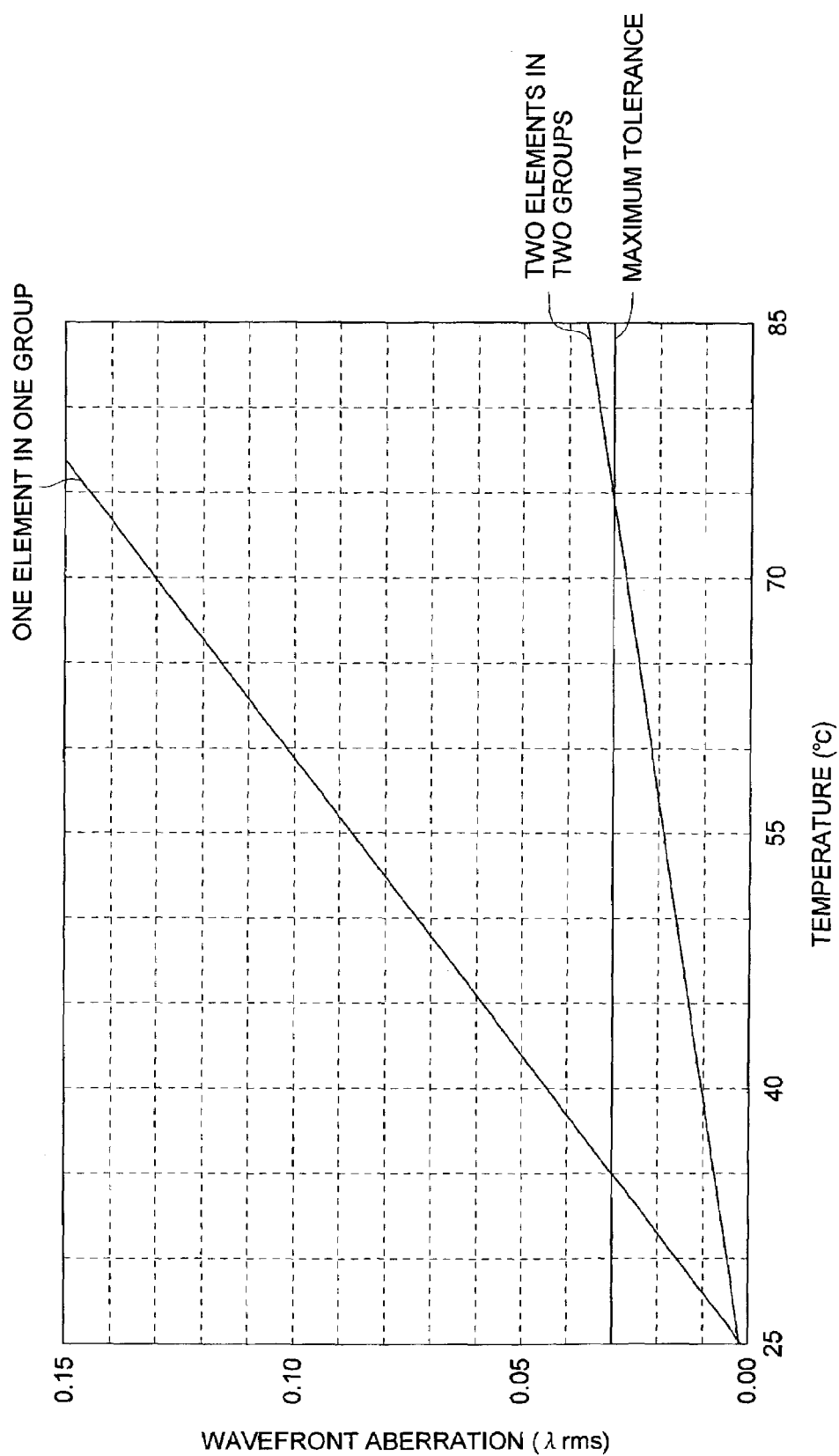
FIG. 1 is a diagram showing how the spherical aberration component of a wavefront aberration of a conventional plastic lens of a single-group single-element structure and a conventional plastic objective lens of a two-group two-element structure designed on the basis of NA 0.05, a design standard wavelength of 405 nm, a focal length of 1.76 mm and a design standard temperature of 25° C. are changed for temperature changes.
Figure 2:
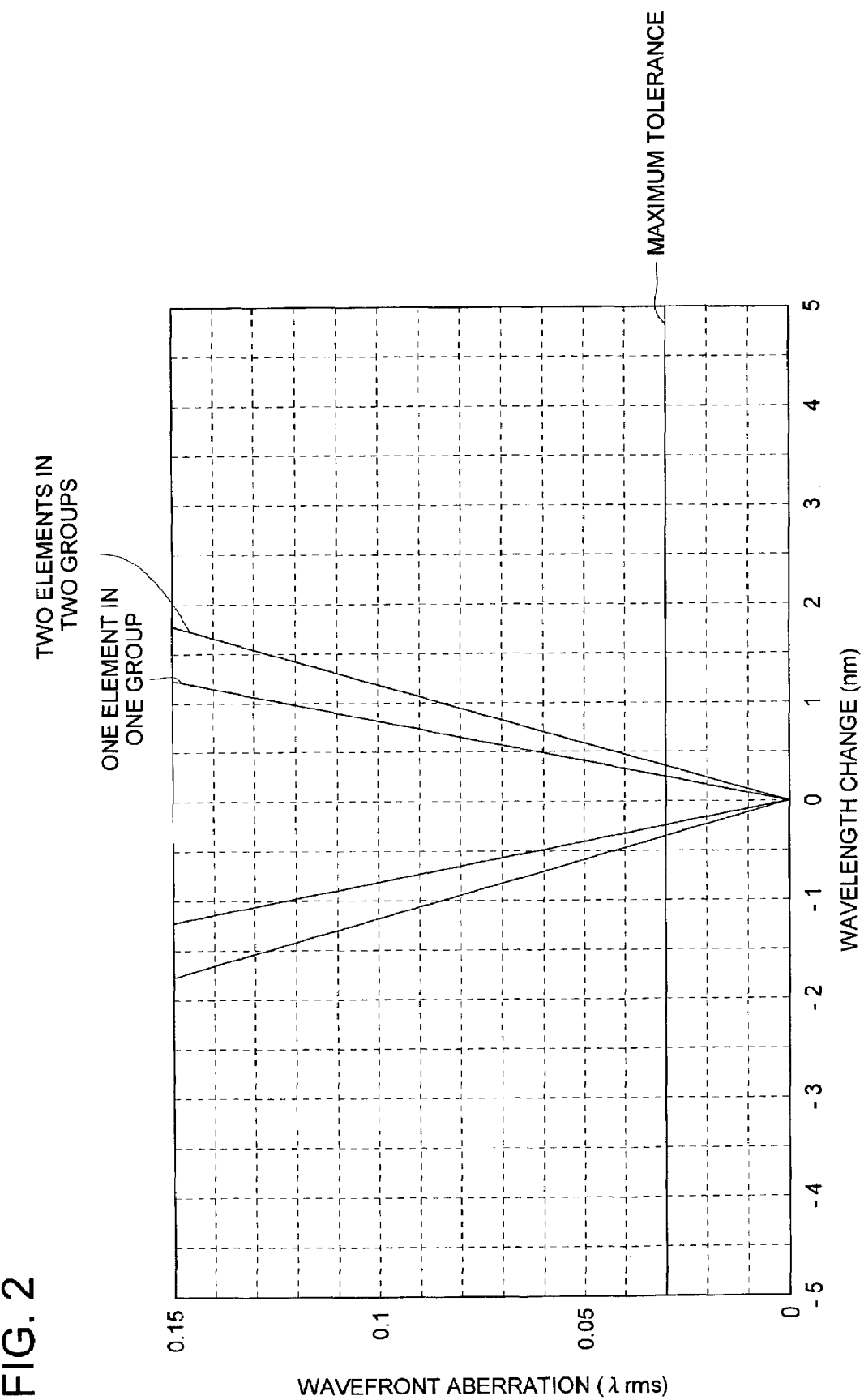
FIG. 2 is a diagram showing how wavefront aberration including a defocus component of the objective lens with regard to the two plastic lenses of FIG. 1 changes when the wavelength of a light flux incident in the objective lens changes from the design standard wavelength (405 nm).

The first embodiment and the second embodiment of the invention will be explained as follows, referring to the drawings.

(First Embodiment)

Figure 3:
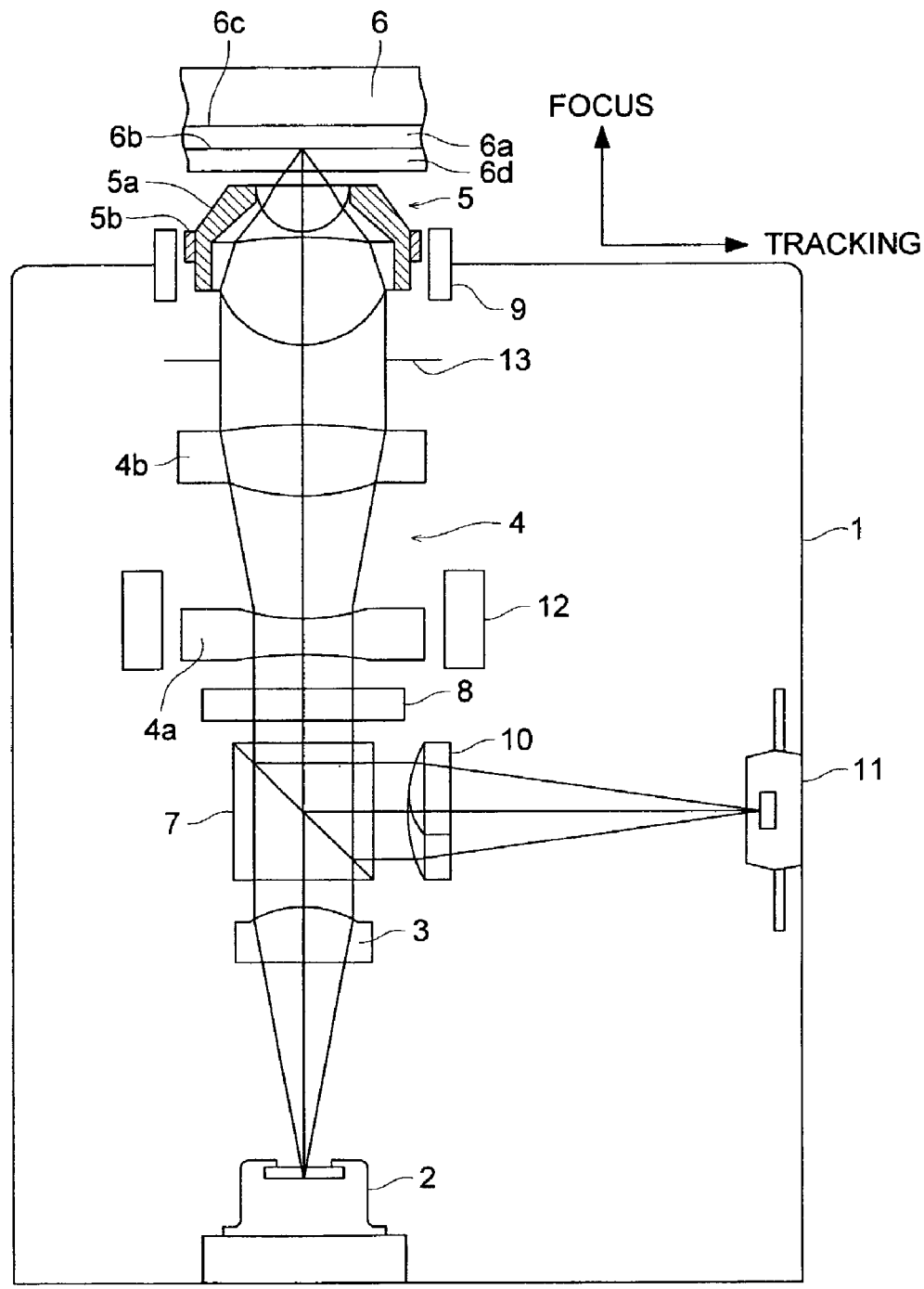
FIG. 3 is a diagram showing schematically the structure of an optical pick-up device including a light-converging optical system relating to the first embodiment.

FIG. 3 is a diagram showing schematically the structure of an optical pick-up device including a light-converging optical system relating to the first embodiment. Optical pick-up device 1 shown in FIG. 3 has therein semiconductor laser 2 serving as a light source, collimator 3 that converts a divergent light flux emitted from the semiconductor laser 2 into a parallel light flux, aberration correcting element 4 and objective lens 5.

The semiconductor laser 2 is GaN type violet laser that emits light having a wavelength of about 400 nm. Further, a light source emitting light having a wavelength of about 400 nm may also include SHG violet laser in addition to the GaN type violet laser.

High density optical disk 6 is a two-layer disk having the first information recording surface 6b and the second information recording surface 6c with intermediate layer 6a between on the same light flux entering surface side. On the light flux entering surface side of the first information recording surface 6b, there is formed 0.1 mm-thick protective layer 6d.

Further, aberration correcting element 4 arranged in a parallel light flux between collimator 3 and objective lens 5 is a beam expander with the structure of two elements in two groups composed of negative lens 4a and positive lens 4b both being a plastic lens, and on the surface of the positive lens 4b on the side of objective lens 5, there is provided a diffractive pattern that is mostly in a shape of concentric circles.

The objective lens 5 is a lens that converges a light flux emerging from aberration correcting element 4 on the first information recording surface 6b of high density disk 6 within a diffraction limit, and it is composed of two plastic lenses which are unified solidly by holding member 5a to have at least one aspheric surface, and the numerical aperture on the disk 6 side is made to be 0.85. Further, the objective lens 5 has flange portion 5b having a plane extending in the direction perpendicular to an optical axis, and this flange portion 5b makes it possible to mount the objective lens 5 accurately on the optical pick-up device 1.

A divergent light flux emitted from semiconductor laser 2 passes through collimator 3 to become a parallel light flux, then, it further passes through polarization beam splitter 7 and ¼ wavelength plate 8 to become a circularly polarized light, and is formed by the objective lens 5 to be a spot on the first information recording surface 6b through protective layer 6d of high density disk 6, after passing through aberration correcting element 4. The objective lens 5 is subjected to focusing control and tracking control conducted by biaxial actuator 9 that is arranged around the objective lens 5.

A reflected light flux modulated by information bits on the first information recording surface 6b is reflected by the polarization beam splitter 7, after passing through objective lens 5, diaphragm 3, aberration correcting element 4 and ¼ wavelength plate 8 again, and passes cylindrical lens 10 to become a convergent light flux to be given astigmatism, and is converged on photo detector 11 whose output signals make it possible to read information recorded on high density disk 6.

In the present embodiment, when the ambient temperature for objective lens 5 and aberration correcting element 4 is raised by radiation of heat from a focusing coil and a tracking coil installed in the vicinity of the objective lens 5 or by a rise of external temperature for the optical pick-up device 1, the refractive index of a plastic lens is changed in the direction to become small, which makes the third-order spherical aberration component to be changing in the under-corrected direction on the objective lens 5. On the other hand, on the standard designed temperature of 25° C., the total paraxial power of the aberration correcting element 4 is zero and a light flux emitted from the aberration correcting element 4 is a parallel light flux. Here, since the positive lens 4b is provided with a diffractive pattern having a positive diffractive power, the total refractive power of the aberration correcting element 4 as a refractive lens is negative on the standard designed temperature of 25° C. Therefore, when the refractive index of the negative lens 4a and the positive lens 4b becomes smaller due to the rise in the ambient temperature, a light flux emitted from the aberration correcting element 4 becomes a convergent light flux. As a result, since the third-order spherical aberration changed in the under-corrected direction is canceled by the convergent light flux entering the objective lens 5, a light flux emitted from semiconductor laser 2 is converged on the first information recording surface 6b under the state where spherical aberration is controlled to be small, even in the case of a rise of ambient temperatures, when the aforementioned light flux passes through the aberration correcting element 4 and the objective lens 5.

Since a diffractive pattern having positive diffracting power is provided on the optical surface of the positive lens 4b of the aberration correcting element 4, longitudinal chromatic aberration whose sign is opposite to and whose absolute value is mostly the same as that of the objective lens 5 is generated, for instantaneous wavelength change of light emitted from semiconductor laser 2. Therefore, the light flux emitted from the semiconductor laser 2 can be converged on the first information recording surface 6b while having hardly longitudinal chromatic aberration, even in the case of instantaneous change of a wavelength of light emitted from the semiconductor laser 2, when the aforementioned light flux passes through the aberration correcting element 4 and objective lens 5.

Further, the negative lens 4a of the aberration correcting element 4 can be moved by uniaxial actuator 12 in the direction of an optical axis, and therefore, spherical aberration that is changed by intermediate layer 6a can be canceled when conducting focus jump from the first information recording surface 6b to the second information recording surface 6c, thus, it is possible to record and reproduce information for the second information recording surface 6c.

(Second Embodiment)

Figure 4:
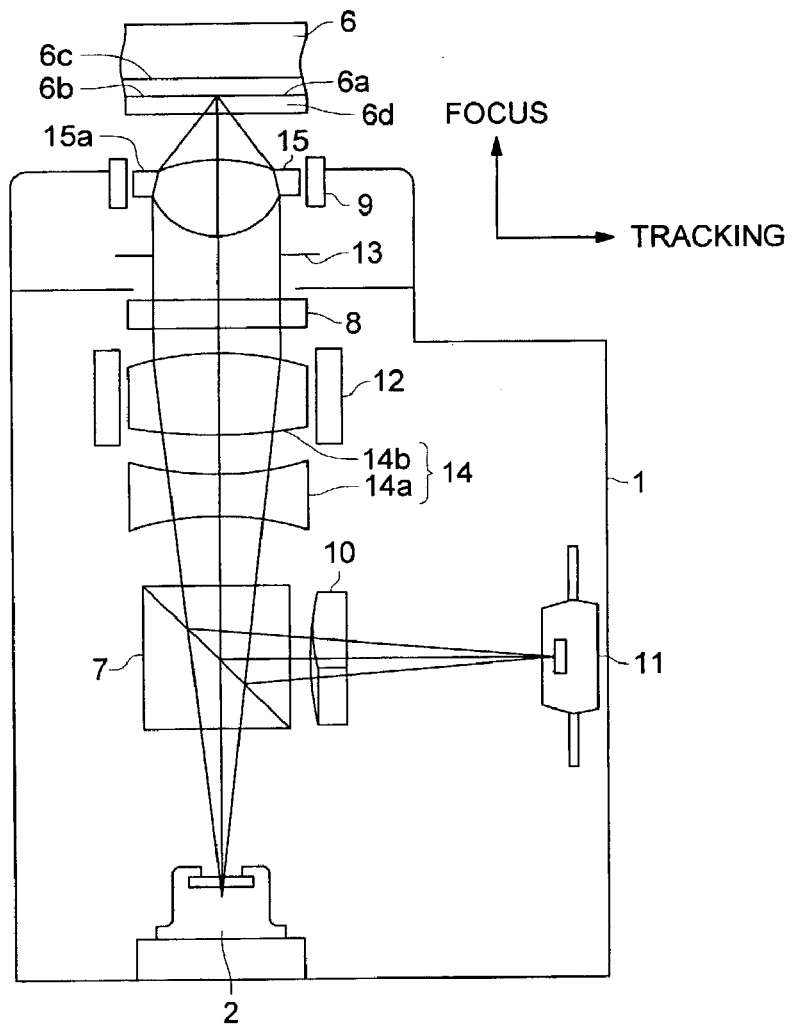
FIG. 4 is a diagram showing schematically the structure of an optical pick-up device including a light-converging optical system relating to the second embodiment.

FIG. 4 is a diagram showing schematically the structure of an optical pick-up apparatus including a light-converging optical system relating to the present embodiment. The optical pick-up apparatus 1' in the present embodiment is an example wherein collimator that converts a divergent light source emitted from semiconductor laser 2 into a parallel light flux and aberration correcting element 4 are unified solidly.

Collimator 14 representing an aberration correcting element has the structure of two element in two groups composed of negative lens 14a of a glass lens and a positive lens 14b of a plastic lens, and a diffractive pattern that is mostly in a shape of concentric circles is provided on the surface of the positive lens 14b on the objective lens 15 side.

Objective lens 15 is a lens that converges a light flux emerging from collimator 14 on the first information recording surface 6b of high density optical disk 16 within a diffraction limit, and the lens mentioned above which is composed of one plastic lens has at least one aspheric surface and a numerical aperture thereof on the optical disk 6 side is 0.85. The objective lens 15 further has flange portion 15b having a plane extending in the direction perpendicular to an optical axis, and this flange portion 15b makes it possible to mount the objective lens 15 accurately on the optical pick-up device 1.

In the present embodiment, when the ambient temperature for objective lens 15 and collimator 14a is raised by radiation of heat from a focusing coil and a tracking coil installed in the vicinity of the objective lens 15 or by a rise of external temperature for the optical pick-up device 1, the refractive index of a plastic lens is changed in the direction to become small, which makes the third-order spherical aberration component to be changed in the over-corrected direction on the objective lens 15. On the other hand, on the standard designed temperature of 25° C., a light flux emitted from the collimator 14 is a parallel light flux. Here, when the refractive index of the positive lens 4b becomes smaller due to the rise in the ambient temperature, since the light-converging action for a light flux by the positive lens 4b becomes weaker, a light flux emitted from the collimator 14 becomes a divergent light flux. As a result, since the third-order spherical aberration changed in the over-corrected direction is canceled by the divergent light flux entering the objective lens 15, a light flux emitted from semiconductor laser 2 is converged on the first information recording surface 6b under the state where spherical aberration is controlled to be small, even in the case of a rise of ambient temperatures, when the aforementioned light flux passes through the collimator 14 and the objective lens 15.

Further, the positive lens 14b of the collimator 14 can be moved by uniaxial actuator 12 in the direction of an optical axis, and therefore, spherical aberration that is changed by intermediate layer 6a can be canceled when conducting focus jump from the first information recording surface 6b to the second information recording surface 6c, thus, it is possible to record and reproduce information for the second information recording surface 6c.

Incidentally, the light-converging optical system, the optical pickup apparatus and the aberration correcting element according to the invention are not limited to the light-converging optical system, the optical pickup apparatus and the aberration correcting element in the first embodiment and the second embodiment sated above and can be varied into various embodiments without deviating the scope of the invention.

EXAMPLES

Next, the invention will be explained more concretely, referring to Examples 1–5, however, the invention is not limited to these examples. Incidentally, an aspheric surface on a lens of the light-converging optical system in the present example is expressed by the following Numeral 1, when the optical axis direction is represented by X axis, a height in the direction perpendicular to the optical axis is represented by h and a radius of curvature of a refracting interface is represented by r, provided that κ represents the conic constant, and $A_{2i}$ represents the aspheric surface coefficient.

$$x = \frac{h^2/r}{1 + \sqrt{1 - (1+\kappa)h^2/r^2}} + \sum_{i=2} A_{2i} h^{2i} \qquad \text{(Numeral 1)}$$

Further, a ring-shaped diffractive pattern provided on a lens of the light-converging optical system in the present example can be expressed by the following Numeral 2 as an optical path difference function Φb. Here, n represents the diffraction order of diffraction light having the maximum light amount among diffraction light generated on the refractive pattern, h represents a height in the direction perpendicular to an optical axis, and $b_{2j}$ represents a coefficient of the optical path difference function (called also diffractive surface coefficient).

$$\Phi_b = n \sum_{j=1} b_{2j} h^{2j} \qquad \text{(Numeral 2)}$$

Example 1

Figure 5:
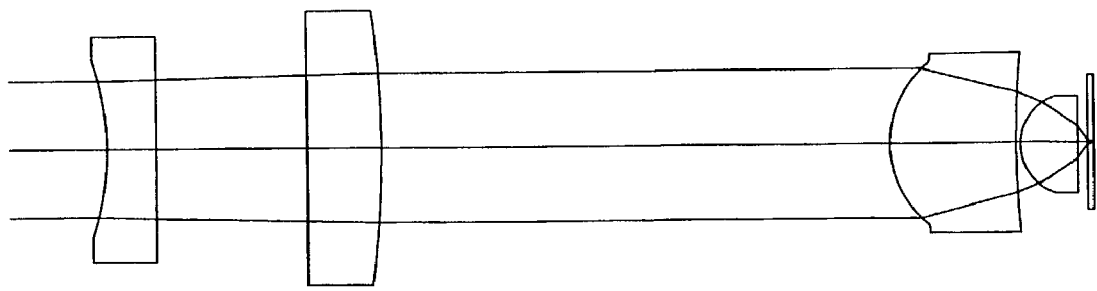
FIG. 5 is an optical path diagram of the light-converging optical system in Example 1.

Table 1 shows data relating to the light-converging optical system in Example 1, and FIG. 5 shows an optical path diagram. The standard designed wavelength of the light-converging optical system in the present example is 405 nm, and standard designed temperature is 25° C. In the present example, a beam expander representing an aberration correcting element structured by two elements in two groups and composed of a negative lens and a positive lens both being a plastic lens is provided on the light source side of a plastic objective lens structured by two elements in two groups.

TABLE 1

Example 1

| Surface No. | r (mm) | d (mm) | $N_{404}$ | $N_{405}$ | $N_{406}$ | Remarks |
|---|---|---|---|---|---|---|
| 0 | ∞ | | | | | Light source |
| 1 | −7.083 | 1.000 | 1.52485 | 1.52469 | 1.52454 | Aberration correcting element |
| 2 | ∞ | 2.860 | | | | |
| 3 | ∞ | 1.500 | 1.52485 | 1.52469 | 1.52454 | |
| 4 | −32.058 | 10.000 | | | | |
| 5 | 1.959 | 2.450 | 1.52485 | 1.52469 | 1.52454 | Objective lens |
| 6 | 10.207 | 0.050 | | | | |
| 7 | 0.892 | 1.100 | 1.52485 | 1.52469 | 1.52454 | |
| 8 | ∞ | 0.201 | | | | |
| 9 | ∞ | 0.100 | 1.61990 | 1.61950 | 1.61909 | Protective layer |
| 10 | ∞ | | | | | |

Aspheric surface coefficient

| | First surface | Fourth surface | Fifth surface |
|---|---|---|---|
| κ | −3.0078E−01 | 4.9763E+00 | −1.6847E−01 |
| $A_4$ | | | −4.8527E−03 |
| $A_6$ | | | −3.6816E−04 |
| $A_8$ | | | −3.6905E−04 |
| $A_{10}$ | | | −2.1477E−04 |
| $A_{12}$ | | | −6.5049E−05 |
| $A_{14}$ | | | 1.3300E−04 |
| $A_{16}$ | | | −4.2576E−05 |

| | Sixth surface | Seventh surface |
|---|---|---|
| κ | 8.3955E+01 | −7.4973E−01 |
| $A_4$ | 5.4087E−03 | 1.2350E−01 |
| $A_6$ | −6.1028E−03 | 1.6589E−02 |
| $A_8$ | −1.4958E−02 | 1.8042E−01 |
| $A_{10}$ | 1.9993E−02 | −1.0532E−01 |
| $A_{12}$ | −1.7848E−02 | |
| $A_{14}$ | | |
| $A_{16}$ | | |

Diffractive surface coefficient

| | Fourth surface |
|---|---|
| $b_2$ | −1.9595E−02 |

In this example, since the objective lens side optical surface of the positive lens of the beam expander is made to be a diffractive surface having a positive diffractive power, the total refractive power of the beam expander as a refractive lens is a negative value at 25° C. With this structure, when the temperature fluctuates, the third-order spherical aberration change due to the refractive index change of the objective lens is canceled relatively with the spherical aberration change of the objective lens due to the fluctuation in the degree of divergence of a light flux emitted from the beam expander. Further, by the momentary fluctuation of the wavelength of light from a light source, a longitudinal chromatic aberration generated by the diffractive surface of the beam expander is canceled relatively with a longitudinal chromatic aberration generated by the objective lens.

Figure 6:
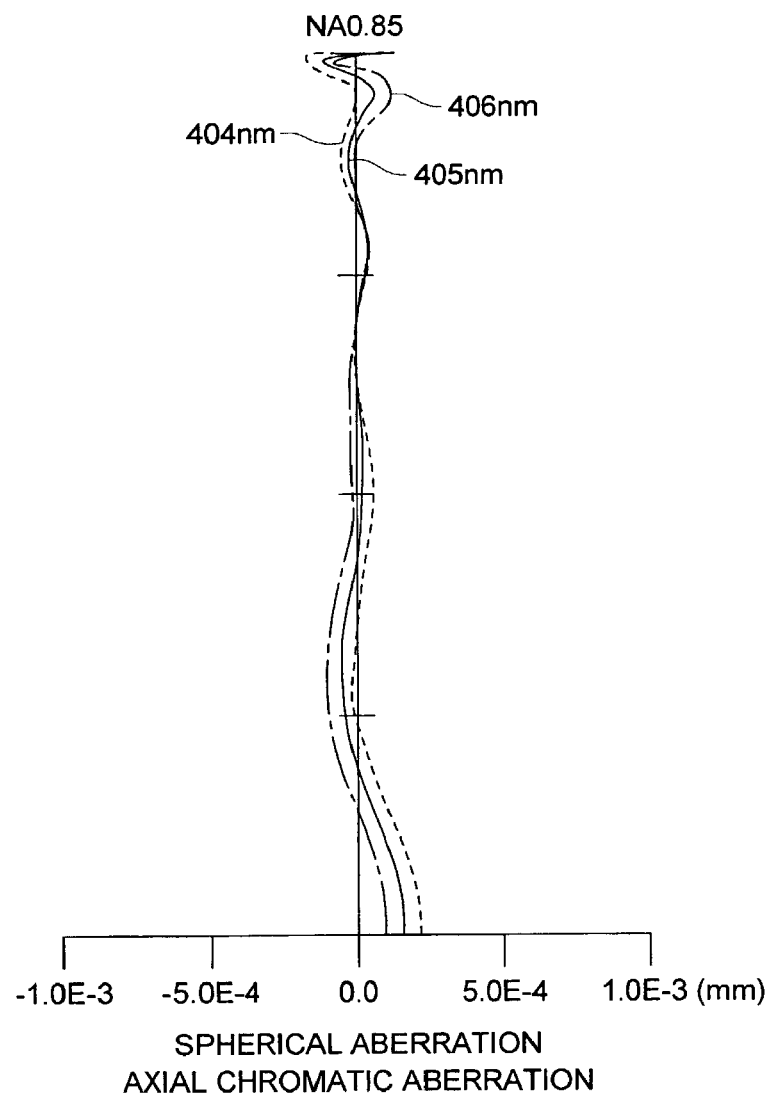
FIG. 6 is a diagram showing the spherical aberration and longitudinal chromatic aberration of the light-converging optical system in Example 1 at wavelength of 405 nm±1 nm.

In the lens data in Table 1, the diffractive surface coefficient is determined such that the first order diffracted-ray has the maximum diffracted-light amount. FIG. 6 is a diagram showing a spherical aberration and a longitudinal chromatic aberration of the converging optical system of the this example on the wavelength of 405 nm±1 nm, indicating that the image forming position is hardly shifted regardless of wavelength.

Example 2

Figure 7:
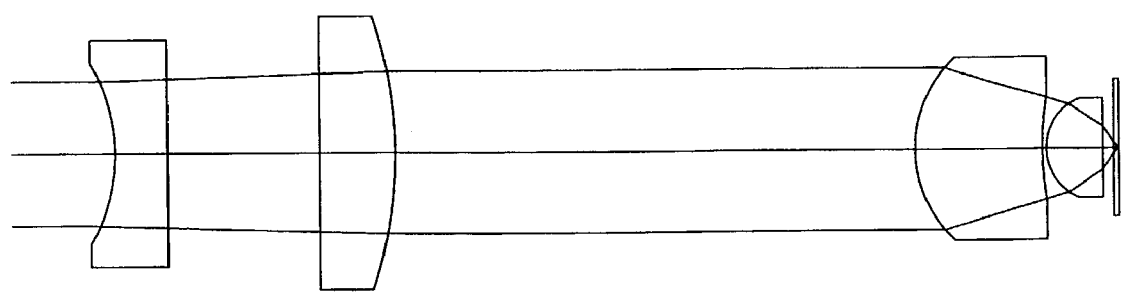
FIG. 7 is an optical path diagram of the light-converging optical system in Example 2.

Table 2 shows data relating to the light-converging optical system in Example 2, and FIG. 7 shows an optical path diagram. The standard designed wavelength of the light-converging optical system in the present example is 405 nm, and standard designed temperature is 25° C. In the present example, a beam expander representing an aberration correcting element structured by two elements in two groups and composed of a negative lens and a positive lens both being a plastic lens is provided on the light source side of a plastic objective lens structured by two elements in two groups.

TABLE 2

Example 2

| Surface No. | r (mm) | d (mm) | $N_{404}$ | $N_{405}$ | $N_{406}$ | Remarks |
|---|---|---|---|---|---|---|
| 0 | ∞ | | | | | Light source |
| 1 | −3.604 | 1.000 | 1.52485 | 1.52469 | 1.52454 | Aberration correcting element |
| 2 | ∞ | 2.863 | | | | |
| 3 | ∞ | 1.500 | 1.52485 | 1.52469 | 1.52454 | |
| 4 | −9.444 | 10.000 | | | | |
| 5 | 1.959 | 2.450 | 1.52485 | 1.52469 | 1.52454 | Objective lens |
| 6 | 10.207 | 0.050 | | | | |
| 7 | 0.892 | 1.100 | 1.52485 | 1.52469 | 1.52454 | |
| 8 | ∞ | 0.201 | | | | |
| 9 | ∞ | 0.100 | 1.61990 | 1.61950 | 1.61909 | Protective layer |
| 10 | ∞ | | | | | |

Aspheric surface coefficient

| | First surface | Fourth surface | Fifth surface |
|---|---|---|---|
| κ | −7.8317E−01 | −1.7522E−01 | −1.6847E−01 |
| $A_4$ | | | −4.8527E−03 |
| $A_6$ | | | −3.6816E−04 |
| $A_8$ | | | −3.6905E−04 |
| $A_{10}$ | | | −2.1477E−04 |
| $A_{12}$ | | | −6.5049E−05 |
| $A_{14}$ | | | 1.3300E−04 |
| $A_{16}$ | | | −4.2576E−05 |

| | Sixth surface | Seventh surface |
|---|---|---|
| κ | 8.3955E+01 | −7.4973E−01 |
| $A_4$ | 5.4087E−03 | 1.2350E−01 |
| $A_6$ | −6.1028E−03 | 1.6589E−02 |
| $A_8$ | −1.4958E−02 | 1.8042E−01 |
| $A_{10}$ | 1.9993E−02 | −1.0532E−01 |
| $A_{12}$ | −1.7848E−02 | |
| $A_{14}$ | | |
| $A_{16}$ | | |

Diffractive surface coefficient

| | First surface |
|---|---|
| $b_2$ | −3.5748E−02 |

In the present example, when the light source side optical surface of the negative lens of the beam expander is made to be a diffractive surface having a positive diffractive power, the total refractive power of the beam expander as a refractive lens is a negative value at 25° C. With this structure, when the temperature fluctuates, the third-order spherical aberration change due to the refractive index change of the objective lens is relatively canceled by the spherical aberration change of the objective lens due to the fluctuation in the degree of divergence of a light flux emitted from the beam expander. Further, by the momentary fluctuation of the wavelength of light from a light source, a longitudinal chromatic aberration generated by the diffractive surface of the beam expander is canceled relatively with a longitudinal chromatic aberration generated by the objective lens.

Figure 8:
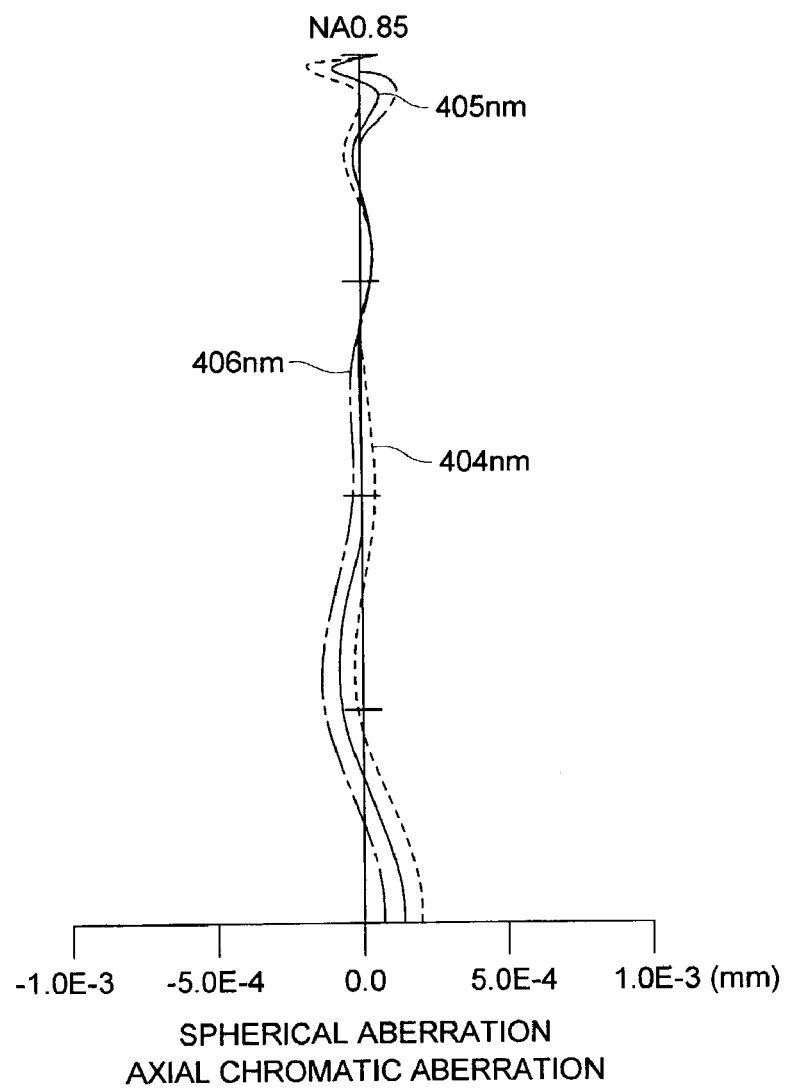
FIG. 8 is a diagram showing the spherical aberration and longitudinal chromatic aberration of the light-converging optical system in Example 2 at wavelength of 405 nm±1 nm.

In the lens data in Table 2, the diffractive surface coefficient is determined so that the first order diffracted-ray may have the maximum diffracted-light amount. FIG. 8 is a diagram showing spherical aberration and longitudinal chromatic aberration both at 405 nm±1 nm of the light-converging optical system of the present example, and FIG. 8 shows that an image forming position is hardly moved, independently of a wavelength.

Example 3

Figure 9:
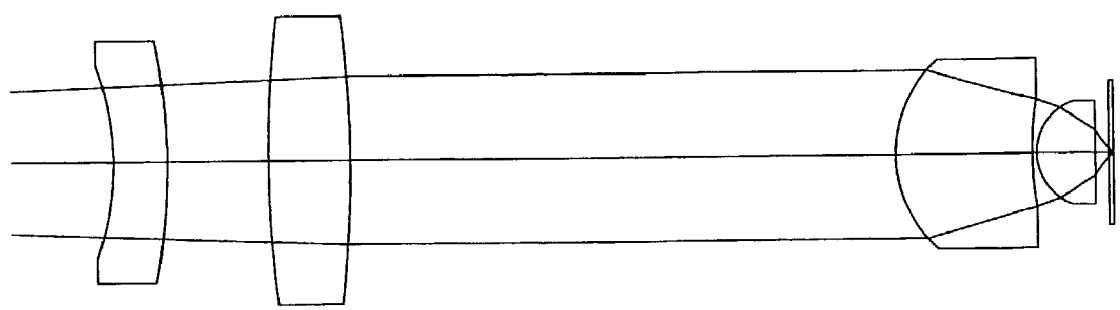
FIG. 9 is an optical path diagram of the light-converging optical system in Example 3.

Table 3 shows data relating to the light-converging optical system in Example 3, and FIG. 9 shows an optical path diagram. The standard designed wavelength of the light-converging optical system in the present example is 405 nm, and standard designed temperature is 25° C. In the present example, a collimator representing an aberration correcting element structured by two elements in two groups and composed of a negative lens and a positive lens both being a plastic lens is provided on the light source side of a plastic objective lens structured by two elements in two groups.

TABLE 3

Example 3

| Surface No. | r (mm) | d (mm) | $N_{404}$ | $N_{405}$ | $N_{406}$ | Remarks |
|---|---|---|---|---|---|---|
| 0 | | 21.412 | | | | Light source |
| 1 | −5.680 | 1.000 | 1.52485 | 1.52469 | 1.52454 | Aberration correcting element |
| 2 | −14.293 | 1.901 | | | | |
| 3 | 34.016 | 1.500 | 1.52485 | 1.52469 | 1.52454 | |
| 4 | −43.880 | 10.000 | | | | |
| 5 | 1.959 | 2.450 | 1.52485 | 1.52469 | 1.52454 | Objective lens |
| 6 | 10.207 | 0.050 | | | | |
| 7 | 0.892 | 1.100 | 1.52485 | 1.52469 | 1.52454 | |
| 8 | ∞ | 0.201 | | | | |
| 9 | ∞ | 0.100 | 1.61990 | 1.61950 | 1.61909 | Protective layer |
| 10 | ∞ | | | | | |

Aspheric surface coefficient

| | First surface | Fourth surface | Fifth surface |
|---|---|---|---|
| κ | −3.9296E−01 | 1.7397E+01 | −1.6847E−01 |
| $A_4$ | | | −4.8527E−03 |
| $A_6$ | | | −3.6816E−04 |
| $A_8$ | | | −3.6905E−04 |
| $A_{10}$ | | | −2.1477E−04 |
| $A_{12}$ | | | −6.5049E−05 |
| $A_{14}$ | | | 1.3300E−04 |
| $A_{16}$ | | | −4.2576E−05 |

| | Sixth surface | Seventh surface |
|---|---|---|
| κ | 8.3955E+01 | −7.4973E−01 |
| $A_4$ | 5.4087E−03 | 1.2350E−01 |
| $A_6$ | −6.1028E−03 | 1.6589E−02 |
| $A_8$ | −1.4958E−02 | 1.8042E−01 |
| $A_{10}$ | 1.9993E−02 | −1.0532E−01 |
| $A_{12}$ | −1.7848E−02 | |
| $A_{14}$ | | |
| $A_{16}$ | | |

Diffractive surface coefficient

| | First surface | Fourth surface |
|---|---|---|
| $b_2$ | −2.1302E−02 | −1.0270E−02 |

In this example, since the light source side optical surface of the negative lens and the objective lens side optical surface of the positive lens of the collimator are made to be a diffractive surface having a positive diffractive power, the total refractive power of the collimator as a refractive lens is a negative value at 25° C. With this structure, when the temperature fluctuates, the third-order spherical aberration change due to the refractive index change of the objective lens is canceled relatively with the spherical aberration change of the objective lens due to the fluctuation in the degree of divergence of a light flux emitted from the beam expander. Further, due to the momentary fluctuation of the wavelength of a light flux from a light source, a longitudinal chromatic aberration generated by the diffractive surface of the beam expander is canceled relatively with a longitudinal chromatic aberration generated by the objective lens.

Figure 10:
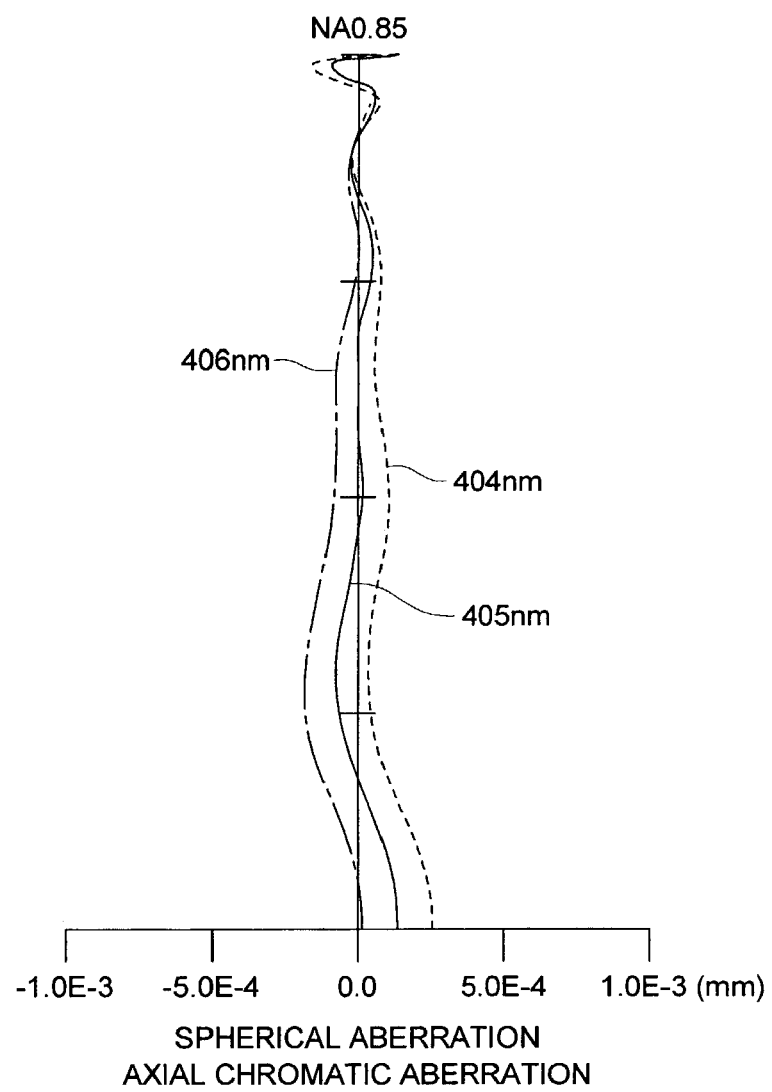
FIG. 10 is a diagram showing the spherical aberration and longitudinal chromatic aberration of the light-converging optical system in Example 3 at wavelength of 405 nm±1 nm.

In the lens data in Table 3, the diffractive surface coefficient is determined such that the first order diffracted-ray has the maximum diffracted-light amount. FIG. 10 is a diagram showing a spherical aberration and a longitudinal chromatic aberration of the converging optical system of the this example on the wavelength of 405 nm±1 nm, indicating that the image forming position is hardly shifted regardless of wavelength.

Example 4

Figure 11:
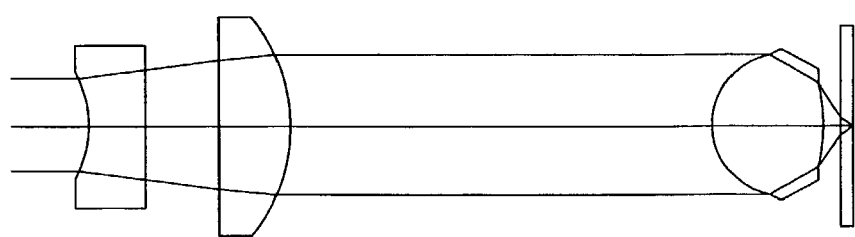
FIG. 11 is an optical path diagram of the light-converging optical system in Example 4.

Table 4 shows data relating to the light-converging optical system in Example 4, and FIG. 11 shows an optical path diagram. The standard designed wavelength of the light-converging optical system in the present example is 405 nm, and standard designed temperature is 25° C. In the present example, a beam expander representing an aberration correcting element structured by two elements in two groups and composed of a negative lens being a glass lens and a positive lens being a plastic lens is provided on the light source side of a plastic objective lens structured by one element in one group.

TABLE 4

Example 4

| Surface No. | r (mm) | d (mm) | $N_{404}$ | $N_{405}$ | $N_{406}$ | Remarks |
|---|---|---|---|---|---|---|
| 0 | | ∞ | | | | Light source |
| 1 | −0.984 | 0.400 | 1.53030 | 1.53017 | 1.53005 | Aberration correcting element |
| 2 | ∞ | 0.500 | | | | |
| 3 | ∞ | 0.550 | 1.56030 | 1.56013 | 1.55997 | |
| 4 | −1.044 | 3.000 | | | | |
| 5 | 0.410 | 0.790 | 1.56030 | 1.56013 | 1.55997 | Objective lens |
| 6 | −0.518 | 0.119 | | | | |
| 7 | ∞ | 0.100 | 1.61990 | 1.61950 | 1.61909 | Protective layer |
| 8 | ∞ | | | | | |

Aspheric surface coefficient

| | Fourth surface | Fifth surface | Sixth surface |
|---|---|---|---|
| κ | −5.4282E−01 | −6.8225E−01 | −2.7583E+01 |
| $A_4$ | 1.5515E−02 | 4.7569E−01 | 5.6751E+00 |
| $A_6$ | 4.7401E−03 | −7.5261E−02 | −6.8184E+01 |
| $A_8$ | | 9.7904E+00 | 3.5710E+02 |
| $A_{10}$ | | −2.9021E+00 | −7.5179E+02 |
| $A_{12}$ | | −1.3130E+02 | −4.5183E+01 |
| $A_{14}$ | | 2.4202E+02 | |
| $A_{16}$ | | 2.2763E+03 | |
| $A_{18}$ | | −2.2834E+03 | |
| $A_{20}$ | | −1.8263E+04 | |

Diffractive surface coefficient

| | Fourth surface |
|---|---|
| $b_2$ | 1.0000E−01 |

In this example, by optimizing the distribution of a paraxial power of a negative lens and a positive lens and the distribution of a refractive power and a diffractive power of a positive lens, the third-order spherical aberration varying in an over-corrected direction on the objective lens due to the ambient temperature change is canceled. In the lens data in Table 4, the diffractive surface coefficient is determined such that the first order diffracted-ray has the maximum diffracted-light amount.

Example 5

Figure 12:
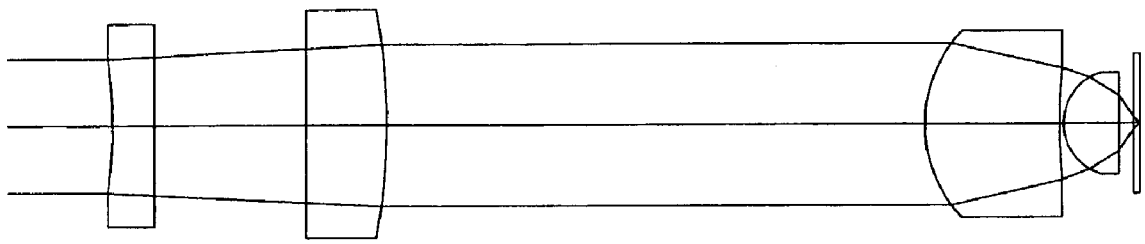
FIG. 12 is an optical path diagram of the light-converging optical system in Example 5.

Table 5 shows data relating to the light-converging optical system in Example 5, and FIG. 12 shows an optical path diagram. The standard designed wavelength of the light-converging optical system in the present example is 405 nm, and standard designed temperature is 25° C. In the present example, a beam expander representing an aberration correcting element structured by two elements in two groups and composed of a negative lens being a glass lens and a positive lens being a plastic lens is provided on the light source side of a plastic objective lens structured by two elements in two groups.

TABLE 5

Example 5

| Surface No. | r (mm) | d (mm) | $N_{404}$ | $N_{405}$ | $N_{406}$ | Remarks |
|---|---|---|---|---|---|---|
| 0 | ∞ | | | | | Light source |
| 1 | −10.082 | 0.800 | 1.52485 | 1.52469 | 1.52454 | Aberration correcting element |
| 2 | 79.480 | 2.791 | | | | |
| 3 | ∞ | 1.500 | 1.50728 | 1.50718 | 1.50708 | |
| 4 | −10.778 | 10.000 | | | | |
| 5 | 2.099 | 2.500 | 1.52485 | 1.52469 | 1.52454 | Objective lens |
| 6 | 7.488 | 0.050 | | | | |
| 7 | 0.850 | 1.100 | 1.52485 | 1.52469 | 1.52454 | |
| 8 | ∞ | 0.240 | | | | |
| 9 | ∞ | 0.100 | 1.61990 | 1.61950 | 1.61909 | Protective layer |
| 10 | ∞ | | | | | |

Aspheric surface coefficient

| | First surface | Second surface | Fifth surface |
|---|---|---|---|
| κ | −3.4571E+00 | 0.0000E+00 | −1.2962E−01 |
| $A_4$ | −2.5932E−04 | 1.7939E−04 | −3.3246E−03 |
| $A_6$ | −1.4472E−05 | −1.5680E−05 | −6.2010E−05 |
| $A_8$ | | | −5.1594E−04 |
| $A_{10}$ | | | −1.1806E−04 |
| $A_{12}$ | | | −6.6480E−05 |
| $A_{14}$ | | | 1.2115E−04 |
| $A_{16}$ | | | −3.9441E−05 |

| | Sixth surface | Seventh surface |
|---|---|---|
| κ | 4.2122E+01 | −7.5218E−01 |
| $A_4$ | 7.0525E−03 | 1.3349E−01 |
| $A_6$ | −1.8316E−02 | 8.6490E−03 |
| $A_8$ | 9.1215E−03 | 2.1567E−01 |
| $A_{10}$ | −6.4308E−03 | −1.0997E−01 |
| $A_{12}$ | −7.4409E−03 | |
| $A_{14}$ | | |
| $A_{16}$ | | |

In this example, by optimizing the distribution of a paraxial power of a negative lens and a positive lens, the third-order spherical aberration varying in an under-corrected direction on the objective lens due to the ambient temperature change is canceled.

Figure 13:
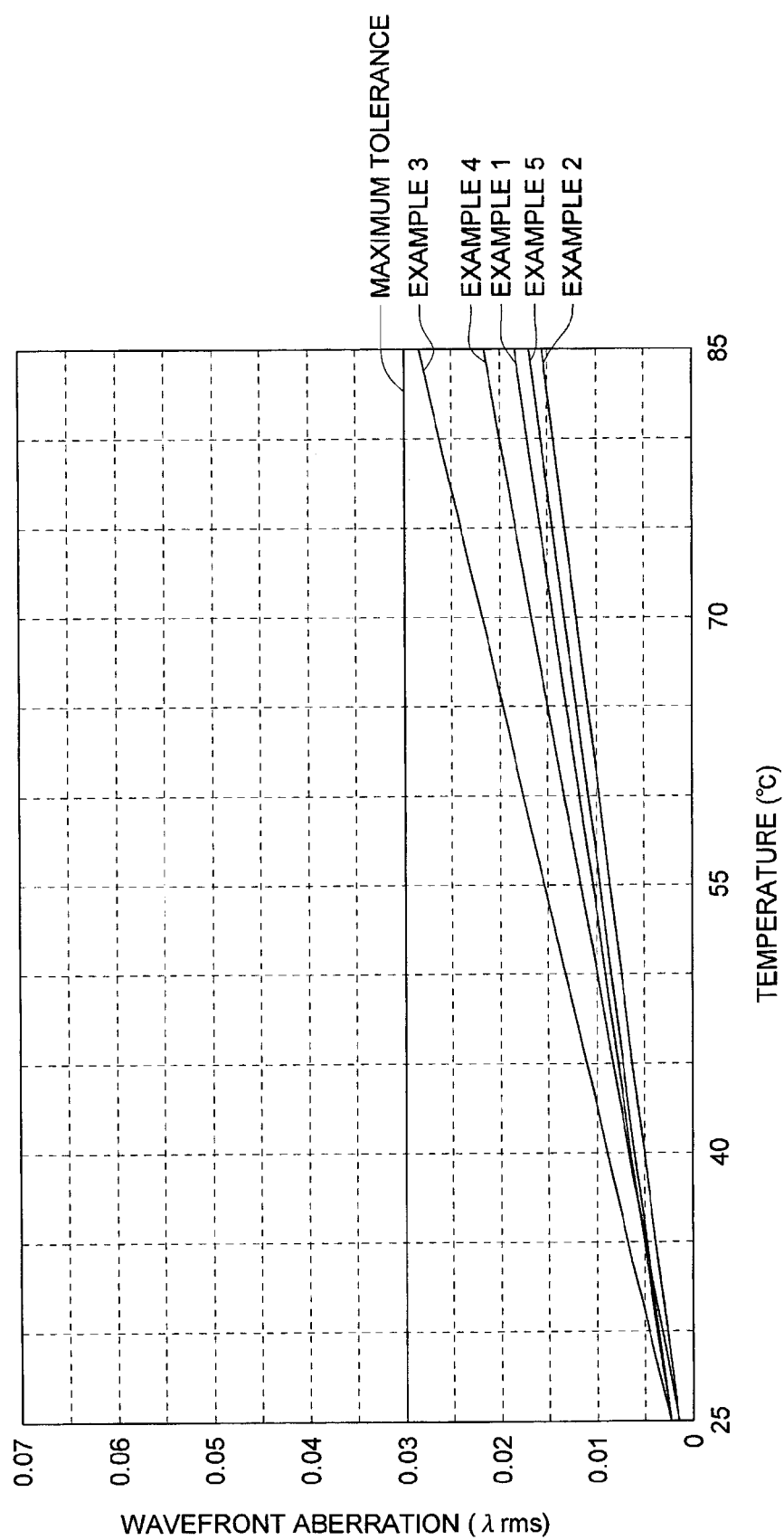
FIG. 13 is a diagram showing the results of the correction wherein the third-order spherical aberration that is changed in the objective lens by a rise of ambient temperatures is corrected by the aberration correcting element in each of Examples 1–5.

Further, FIG. 13 shows the results of corrections made by aberration correcting elements in Examples 1–5 for the third-order spherical aberration which was changed on the objective lens by a rise of ambient temperature. At the temperature of 85° C. which is a temperature to assure operations of an optical disk player, the third-order spherical aberration is 0.03 λ rms or less in any case of Examples 1–5. Incidentally, when calculating RMS values of wavefront aberration in FIG. 13, a point to be duly considered is only a change of a refractive index of a plastic lens for a change of ambient temperature, and its amount of changes is about −1.0×10$^{-4}$/° C.

Figure 14:
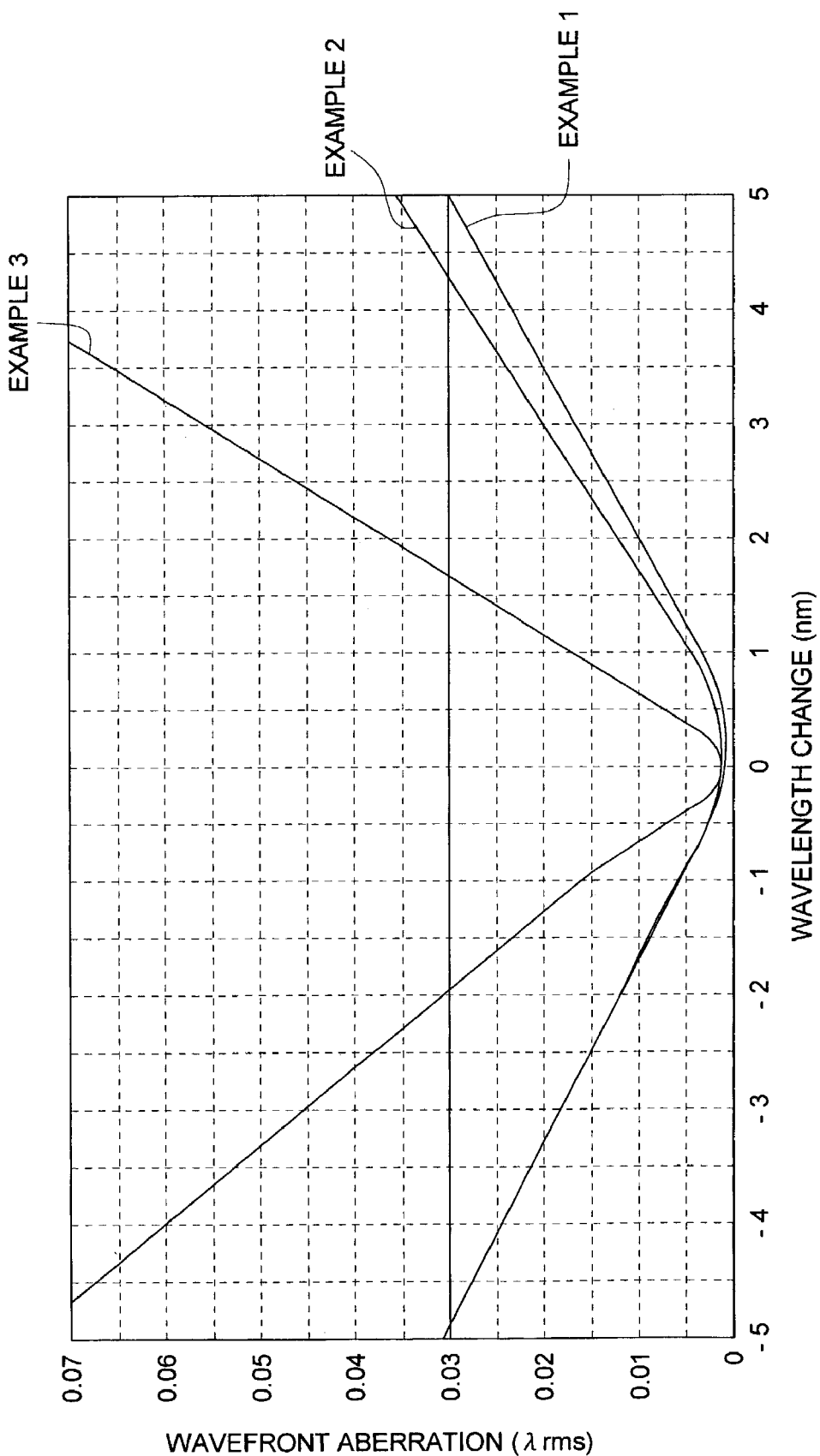
FIG. 14 is a diagram showing the results of the correction wherein the longitudinal chromatic aberration caused on the objective lens by the instantaneous wavelength change of the light source is corrected by the aberration correcting element in each of Examples 1–5.

Further, FIG. 14 shows the results of corrections made by aberration correcting elements in Examples 1–3 for the longitudinal chromatic aberration caused on the objective lens by instantaneous wavelength changes of a light source. When there happens the wavelength change of ±1 nm corresponding to the wavelength change caused by mode hopping of a violet semiconductor laser, the longitudinal chromatic aberration is 0.03 λ rms or less for wavelength change of ±1 nm in any cases of Examples 1–3. Incidentally, when wavelength change 0 corresponds to 405 nm representing the standard designed wavelength and when calculating RMS values of wavefront aberration in FIG. 14, the objective lens is fixed to the best focus position at 405 nm.

Figure 15:
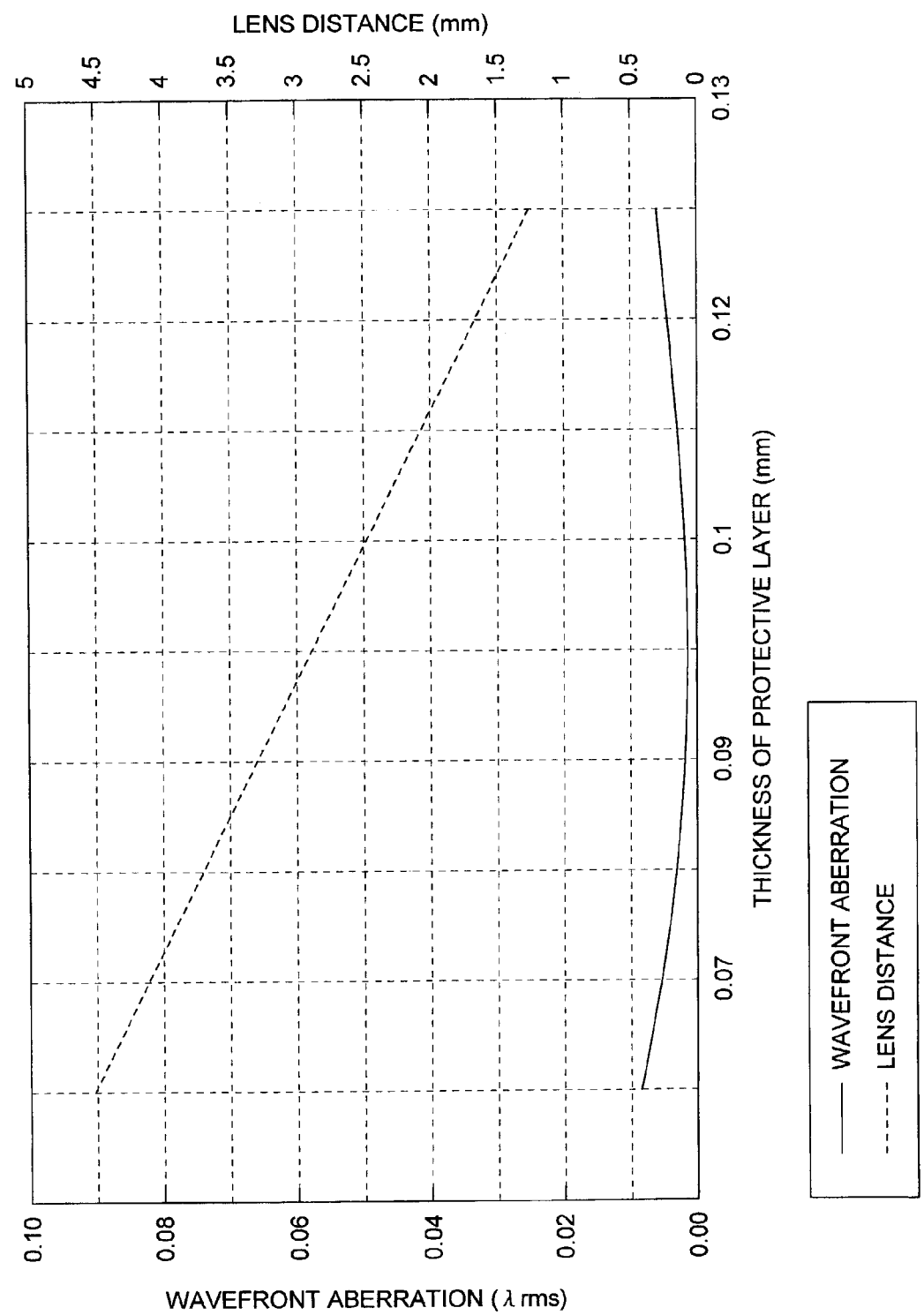
FIG. 15 is a diagram showing the results of the correction wherein the third-order spherical aberration changed when a thickness of the protective layer is changed in the light-converging optical system in Example 2 is corrected by changing a distance between aberration correcting elements.
Figure 16:
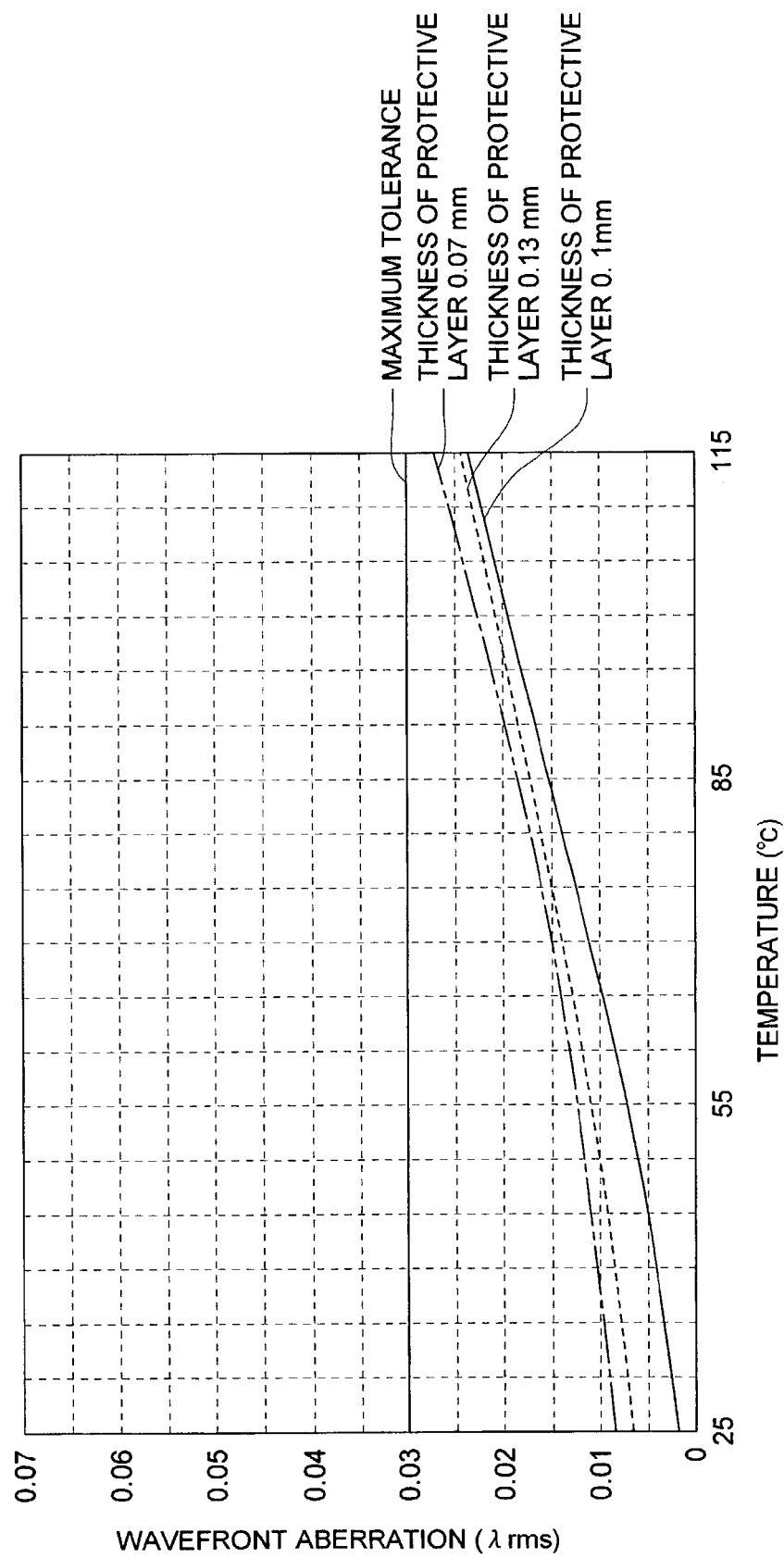
FIG. 16 is a diagram showing the RMS value of the wavefront aberration in the case of a rise of ambient temperatures after the correction in FIG. 15.
Figure 17:
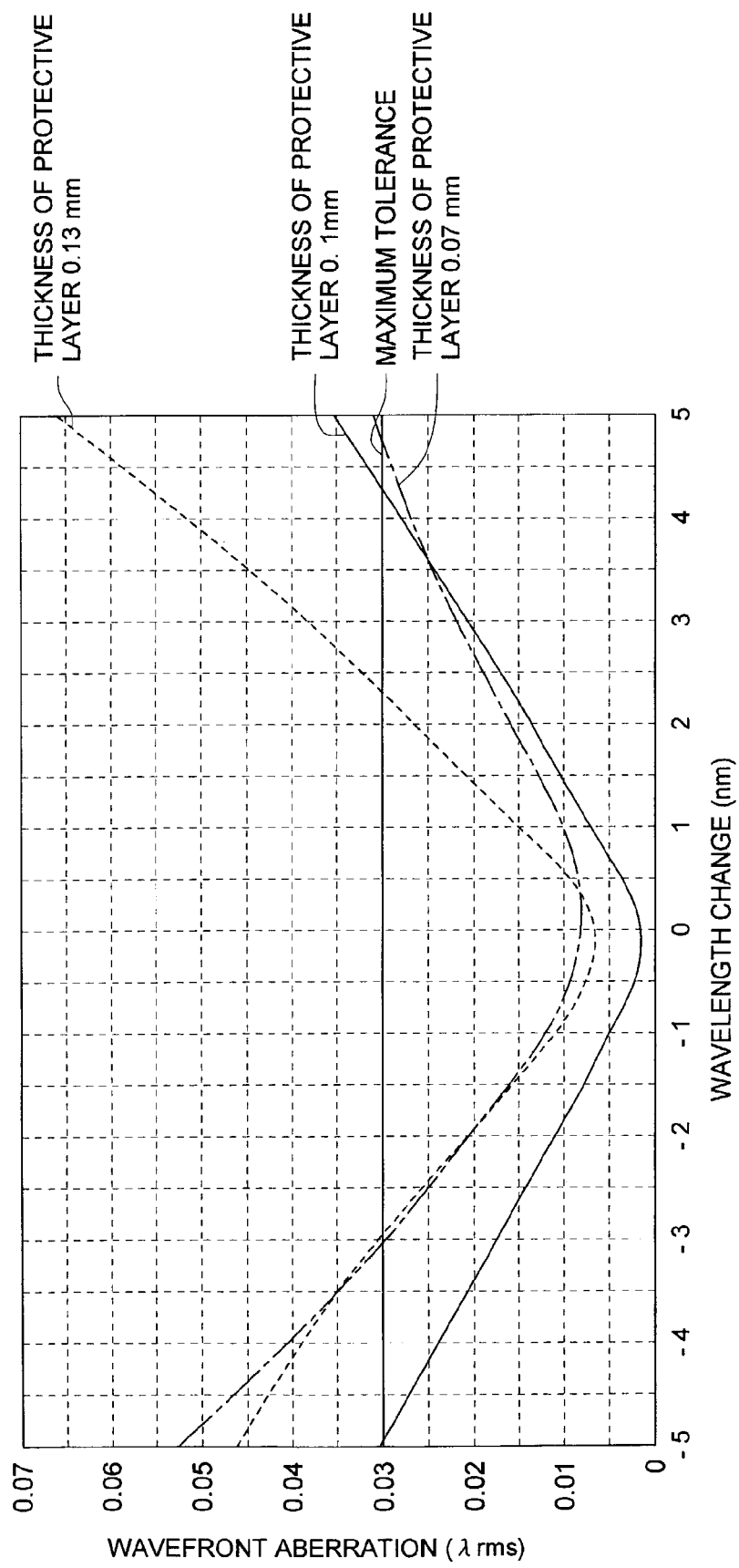
FIG. 17 is a diagram showing the RMS value in the case of occurrence of instantaneous wavelength change of the light source after the correction in FIG. 15.

Further, FIG. 15 shows results of the correction wherein the third-order aberration changed when a thickness of a protective layer was changed was corrected by changing a distance between aberration correcting elements in the light-converging optical system in Example 2, thereafter, FIG. 16 shows the RMS value of the wavefront aberration in the case of a rise of ambient temperatures, and FIG. 17 shows the RMS value of the wavefront aberration in the case of occurrence of the instantaneous wavelength change of the light source. In FIG. 15, "lens distance" indicates a distance between the negative lens and the positive lens of the aberration correcting element on the optical axis. Each of FIGS. 15–17 shows that the light-converging optical system of Example 2 can cope also with a multi-layer disk having a plurality of information recording surfaces on the same incident surface for the light flux.

In the lens data in the aforementioned Tables 1–5, r (mm) represents a radius of curvature, d (mm) represents a distance between surfaces, and $N_{404}$, $N_{405}$ and $N_{406}$ represent a refractive index respectively for wavelengths 404 nm, 405 nm and 406 nm.

Further, in the above tables and figures, there may be a case that the expression for the power of 10 is represented by using "E" such that, for example, E-02 (=10$^{-2}$).

In the invention, a diffractive surface, or an optical surface on which a diffractive structure is formed, or an optical surface on which a diffractive pattern is formed means an optical surface wherein a relief is provided on the surface of an optical element, so that the surface may have a function to diffract an incident light flux. And when there exist an area causing diffraction and an area causing no diffraction on the same optical surface, the diffractive surface, or an optical surface on which a diffractive structure is formed, or an optical surface on which a diffractive pattern is formed means the area causing diffraction. A form of the relief includes a known form wherein ring-shaped zones which are mostly in a shape of concentric circles whose centers are on an optical axis are formed on the surface of an optical element, for example, and each of the ring-shaped zones on a section thereof on a plane including the optical axis is in a serrated form, or in a stepwise form.

Recording information and reproducing information in the present invention mean respectively recording information on an information recording surface of the optical information recording medium as that described above and reproducing information recorded on the information recording surface. A light-converging optical system of the invention may either be one used for recording only or for reproducing only, or be one used for conducting both recording and reproducing. Further, it may also be one used to conduct recording for a certain optical information recording medium and to conduct reproducing for another optical information recording medium, or one used to conduct recording or reproducing for a certain optical information recording medium and to conduct recording and reproducing for another optical information recording medium. Incidentally, reproducing mentioned here includes also reading simply information.

In the specification of the present invention, the objective lens is directed with a narrower aspect to a lens having a light-converging function and being arranged opposite to an optical information recording medium at a position closest to the optical information recording medium on a condition that the optical information recording medium is installed in an optical pickup apparatus, and the objective lens is directed with a broader sense to a lens shiftable in at least a direction of the optical axis together with the above lens by an actuator. Therefore, in the specification, an optical information recording media side (image side) numerical aperture is a numerical aperture of an optical surface of the objective lens located closes to the optical information recording medium. Further, in the specification, a necessary (or predetermined) numerical aperture is directed to a numerical aperture specified by the standard of each optical information recording medium, or a numerical aperture of an objective lens having a refractive critical function capable of obtaining a beam spot diameter necessary for recording or reproducing information for a respective optical information recording medium in accordance with the wavelength of a used light source.

Further, the aberration correcting element of the present invention is defined as follows. It is assumed that $SA1_{obj}$ is a third-order spherical aberration component when the wavefront aberration of an objective lens including at least one plastic lens is measured after ample time has elapsed (that is, the refractive index change of the objective lens becomes a static state) after the objective lens has been left under the ambient temperature of 25° C. and that $SA2_{obj}$ is a third-order spherical aberration component when the wavefront aberration of the objective lens is measured likewise after ample time has elapsed after the objective lens has been left under the ambient temperature of 55° C. Further, it is assumed that $SA1_{obj+AC}$ is a third-order spherical aberration component when the wavefront aberration of an optical system in which "certain optical element" is provided between the light source and the objective lens is measured after ample time has elapsed after the optical system has been left under the ambient temperature of 25° C. and that $SA2_{obj+AC}$ is a third-order spherical aberration component when the wavefront aberration of the optical system is measured likewise after ample time has elapsed after the optical system has been left under the ambient temperature of 55° C. When the above four measurement values of the third-order spherical aberration components satisfies the conditional formula of $|SA2_{OBJ} - SA1_{OBJ}| > |SA2_{OBJ+AC} - SA1_{OBJ+AC}|$, the "certain optical element" is defined as an aberration correcting element of the present invention.

(Effect of the Invention)

In the invention, it is possible to provide a light-converging optical system used for a high density optical information recording medium such as a high density DVD wherein there is provided an aberration correcting element that can control the change in spherical aberration caused on a high NA plastic objective lens by temperature changes to be small with a relatively simple structure. Further, it is possible to provide a light-converging optical system which can control longitudinal chromatic aberration caused on an objective lens to be small in the case of using a light source such as a semiconductor laser in which the wavelength momentarily changes.

Further, it is possible to provide a optical pickup apparatus employing the above light-converging optical system and a recording and reproducing apparatus employing the optical pickup apparatus.

It is further possible to provide an aberration correcting element that can be applied to an optical pick-up device equipped with a high NA plastic objective lens for a high density optical information recording medium such as a high density DVD wherein the change in spherical aberration caused on a high NA plastic objective lens by temperature changes can be controlled to be small with a relatively simple structure. Also, it is possible to provide an aberration correcting element that controls longitudinal chromatic aberration caused on the objective lens to be small in the case of using a light source such as a semiconductor laser in which the wavelength momentarily change. Furthermore, it is possible to provide an objective lens which can be used in the light-converging optical system.

What is claimed is:

1. A light-converging optical system for recording and/or reproducing for an optical information recording medium to converge a light flux emitted from a light source onto an information recording plane of the optical information recording medium, comprising:

an objective lens arranged at a position to be opposite to the optical information recording medium and including at least one plastic lens, and an aberration correcting element provided on an optical path between the light source and the objective lens and structured by two groups of a positive lens and a negative lens both being a plastic lens;

wherein at least one of the positive lens and the negative lens has at least one diffractive surface on which a diffractive structure is formed and a total paraxial power of the aberration correcting element has a temperature dependency satisfying a formula of:

$$P_{T1} < P_{T0} < P_{T2}, \text{ or } P_{T1} > P_{T0} > P_{T2},$$

where $P_{T0}$ is the total paraxial power (mm$^{-1}$) of the aberration correcting element under the temperature of 25° C., $P_{T1}$ is the total paraxial power (mm$^{-1}$) of the aberration correcting element under the temperature of −5° C., and $P_{T2}$ is the total paraxial power (mm$^{-1}$) of the aberration correcting element under the temperature of 55° C.

2. A light-converging optical system for recording and/or reproducing for an optical information recording medium to converge a light flux emitted from a light source onto an information recording plane of the optical information recording medium, comprising:

an objective lens arranged at a position to be opposite to the optical information recording medium and including at least one plastic lens, and an aberration correcting element provided on an optical path between the light source and the objective lens and structured by two groups of a positive lens and a negative lens in which one of the positive lens and the negative lens is a plastic lens and the other one is a glass lens;

wherein a total paraxial power of the aberration correcting element has a temperature dependency satisfying a formula of:

$P_{T1} < P_{T0} < P_{T2}$, or $P_{T1} > P_{T0} > P_{T2}$, where $P_{T0}$ is the total paraxial power (mm$^{-1}$) of the aberration correcting element under the temperature of 25° C., $P_{T1}$ is the total paraxial power (mm$^{-1}$) of the aberration correcting element under the temperature of −5° C., and $P_{T2}$ is the total paraxial power (mm$^{-1}$) of the aberration correcting element under the temperature of 55° C.

3. The light-converging optical system of claim 1 or 2, wherein the aberration correcting element satisfies the formula of $P_{T1} < P_{T0} < P_{T2}$, and the following formulas are satisfied:

$P_R < 0$ $3SA_{OBJ}(55°\ C.) − 3SA_{OBJ}(25°\ C.) < 0$ where $P_R$ is the total sum of refractive powers of all plastic lens included in the aberration correcting element;

$3SA_{OBJ}(55°\ C.)$ is a third order spherical aberration component of a residual aberration of the objective lens under the temperature of 55° C.; and $3SA_{OBJ}(25°\ C.)$ is a third order spherical aberration component of a residual aberration of the objective lens under the temperature of 25° C., wherein the sign of the third order spherical aberration component is plus (+) when the third order spherical aberration component is over-corrected and is minus (−) when the third order spherical aberration component is under-corrected.

4. The light-converging optical system of claim 3, wherein the objective lens is an objective lens structured by two elements in two groups in which a first lens having a positive refractive power and a second lens having a positive refractive power are arranged in this order from the light source side, and wherein one lens including at least the first lens is a plastic lens.

5. The light-converging optical system of claim 3, wherein the plastic lens included in the aberration correcting element comprises at least one diffractive surface on which a diffractive structure is formed, and the following formula is satisfied:

$P_D > 0$ where $P_D$ is a total sum (mm$^{-1}$) of diffractive powers defined by a formula of $(P_D = \Sigma(−2 \cdot n \cdot b_2))$ when an optical path difference provided to a wavefront having passed through the diffractive structure is represented by a formula of $(\Phi b = n \cdot (b_2 \cdot h^2 + b_4 \cdot h^4 + b_6 \cdot h^6 + \ldots))$ (here, n is a diffraction order of a diffracted ray having a maximum light amount among diffracted rays generated by the diffractive structure, h is a height from an optical axis (mm), and $b_2$, $b_4$ and $b_6$ . . . are respectively $2^{nd}$, $4^{th}$ and $6^{th}$ . . . order optical path difference function coefficients (or called diffractive surface coefficients).

6. The light-converging optical system of claim 1 or 2, wherein the aberration correcting element satisfies the formula of $P_{T1} > P_{T0} > P_{T2}$, and the following formulas are satisfied:

$P_R > 0$ $3SA_{OBJ}(55°\ C.) − 3SA_{OBJ}(25°\ C.) > 0$ where $P_R$ is the total sum of refractive powers of all plastic lens included in the aberration correcting element;

$3SA_{OBJ}(55°\ C.)$ is a third order spherical aberration component of a residual aberration of the objective lens under the temperature of 55° C.; and $3SA_{OBJ}(25°\ C.)$ is a third order spherical aberration component of a residual aberration of the objective lens under the temperature of 25° C., wherein the sign of the third order spherical aberration component is plus (+) when the third order spherical aberration component is over-corrected and is minus (−) when the third order spherical aberration component is under-corrected.

7. The light-converging optical system of claim 6, wherein the objective lens is a plastic lens structured by one element in one group.

8. The light-converging optical system of claim 6, wherein the plastic lens included in the aberration correcting element comprises at least one diffractive surface on which a diffractive structure is formed, and the following formula is satisfied:

$P_D < 0$ where $P_D$ is a total sum (mm$^{-1}$) of diffractive powers defined by a formula of $(P_D = \Sigma(−2 \cdot n \cdot b_2))$ when an optical path difference provided to a wavefront having passed through the diffractive structure is represented by a formula of $(\Phi b = n \cdot (b_2 \cdot h^2 + b_4 \cdot h^4 + b_6 \cdot h^6 + \ldots))$ (here, n is a diffraction order of a diffracted ray having a maximum light amount among diffracted rays generated by the diffractive structure, h represents a height from an optical axis (mm), and $b_2$, $b_4$ and $b_6$ . . . are respectively $2^{nd}$, $4^{th}$ and $6^{th}$ . . . order optical path difference function coefficients (or called diffractive surface coefficients).

9. A light-converging optical system for converging a light flux emitted from a light source on an information recording plane of a optical information recording medium for recording and/or reproducing for the optical information recording medium, comprising:

an objective lens arranged at a position to be opposite to the optical information recording medium and including at least one plastic lens, and an aberration correcting element provided on an optical path between the light source and the objective lens and structured by two groups of a positive lens and a negative lens both being a plastic lens;

wherein at least one of the positive lens and the negative lens has at least one diffractive surface on which a diffractive structure is formed and the following formulas are satisfied:

$P_D > 0$ $\Delta 3SA_{OBJ}/\Delta T_{OBJ} < 0$ $P_{\lambda 1} < P_{\lambda 0} < P_{\lambda 2}$, where $P_D$ is a total sum (mm$^{-1}$) of diffractive powers defined by a formula of $(P_D = \Sigma(−2 \cdot n \cdot b_2))$ when an optical path difference provided to a wavefront having passed through the diffractive structure is represented by a formula of $(\Phi b = n \cdot (b_2 \cdot h^2 + b_4 \cdot h^4 + b_6 \cdot h^6 + \ldots))$(here, n is a diffraction order of a diffracted ray having a maximum light amount among diffracted rays generated by the diffractive structure, h represents a height from an optical axis (mm), and $b_2$, $b_4$ and $b_6$ . . . are respectively $2^{nd}$, $4^{th}$ and $6^{th}$ . . . order optical path difference function coefficients (or called diffractive surface coefficients), $\Delta T_{OBJ}$ represents an fluctuation amount of the ambient temperature of the objective lens, $\Delta 3SA_{OBJ}$ represents a change amount of the third order spherical aberration component in the case of developing a residual aberration of the objective lens into a Zernike's polynomial expression when a refractive index of at least one plastic lens among plastic lenses included in the objective lens fluctuates due to a fluctuation $\Delta T_{OBJ}$ of the ambient temperature of the objective lens, wherein the sign of the third order spherical aberration component is plus (+) when the third order spherical aberration component is over-corrected and is minus (−) when the third order spherical aberration component is under-corrected, $P_{\lambda 0}$ is the total paraxial power ($mm^{-1}$) of the aberration correcting element with a wavelength of a light flux emitted from the light source, $P_{\lambda 1}$ is the total paraxial power ($mm^{-1}$) of the aberration correcting element with a wavelength shorter by 10 nm than the wavelength of the light flux emitted from the light source, and $P_{\lambda 2}$ is the total paraxial power ($mm^{-1}$) of the aberration correcting element with a wavelength longer by 10 nm than the wavelength of the light flux emitted from the light source.

10. The light-converging optical system of claim 9, wherein the objective lens is an objective lens structured by two elements in two groups in which a first lens having a positive refractive power and a second lens having a positive refractive power are arranged in this order from the light source side, and wherein at least one lens including the first lens is a plastic lens.

11. The light-converging optical system of claim 9, wherein the following formulas are satisfied:

$$1.0 \times 10^{-2} < P_D < 10.0 \times 10^{-2}$$

$$P_R < 0$$

$$-30.0 \times 10^{-4} < \Delta 3SA_{OBJ}/(\Delta T_{OBJ} \cdot NA^4 f_{OBJ}) < 0$$

$$0.5 \times 10^{-3} < \Delta fB_{OBJ}/f_{OBJ} < 2.5 \times 10^{-3}$$

where $P_R$ is the total sum of refractive powers of all plastic lenses included in the aberration correcting element, NA is a prescribed image side numerical aperture of the objective lens necessary for recording and/or reproducing for the optical information recording medium, $f_{OBJ}$ is a focal length (mm) of the objective lens, and $\Delta fB_{OBJ}$ is a longitudinal chromatic aberration (mm) when a light flux having a wavelength longer by 10 nm than that of the light flux emitted from the light source comes to be incident into the objective lens.

12. A light-converging optical system for converging a light flux emitted from a light source on an information recording plane of a optical information recording medium for recording and/or reproducing for the optical information recording medium, comprising:

an objective lens arranged at a position to be opposite to the optical information recording medium and including at least one plastic lens, and an aberration correcting element provided on an optical path between the light source and the objective lens and structured by two groups of a positive lens and a negative lens at least one of which is a plastic lens, wherein the lens being the plastic lens among the positive lens and the negative lens has at least one diffractive surface on which a diffractive structure is formed;

wherein the aberration correcting element corrects a change of the spherical aberration of the objective lens caused by a fluctuation of the refractive index of at least one plastic lens among plastic lenses included in the objective lens due to a fluctuation of the ambient temperature of the light-converging optical system with a change of the degree of divergence of a light flux emitted from the aberration correcting element caused by the fluctuation of the refractive index of the plastic lens of the aberration correcting element and the following formula is satisfied:

$$P_{\lambda 1} < P_{\lambda 0} < P_{\lambda 2},$$

where $P_{\lambda 0}$ is the total paraxial power ($mm^{-1}$) of the aberration correcting element with a wavelength of a light flux emitted from the light source, $P_{\lambda 1}$ is the total paraxial power ($mm^{-1}$) of the aberration correcting element with a wavelength shorter by 10 nm than the wavelength of the light flux emitted from the light source, and $P_{\lambda 2}$ is the total paraxial power ($mm^{-1}$) of the aberration correcting element with a wavelength longer by 10 nm than the wavelength of the light flux emitted from the light source.

13. The light-converging optical system of claim 12, wherein the positive lens of the aberration correcting element is a plastic lens and the following formulas are satisfied:

$$\Delta 3SA_{OBJ}/\Delta T_{OBJ} > 0$$

$$P_R > 0$$

where $\Delta 3SA_{OBJ}$ represents a change amount of the third order spherical aberration component in the case of developing a residual aberration of the objective lens into a Zernike's polynomial expression when a refractive index of at least one plastic lens among plastic lenses included in the objective lens fluctuates due to a fluctuation $\Delta T_{OBJ}$ of the ambient temperature of the objective lens, wherein the sign of the third order spherical aberration component is plus (+) when the third order spherical aberration component is over-corrected and is minus (−) when the third order spherical aberration component is under-corrected, $\Delta T_{OBJ}$ is a fluctuation amount of the ambient temperature of the objective lens, and $P_R$ is the total sum of refractive powers of plastic lenses included in the aberration correcting element.

14. The light-converging optical system of claim 13, wherein the objective lens is a plastic lens structured by one element in one group.

15. The light-converging optical system of claim 12, wherein the negative lens of the aberration correcting element is a plastic lens and the following formulas are satisfied:

$$\Delta 3SA_{OBJ}/\Delta T_{OBJ} < 0$$

$$P_R < 0$$

where $\Delta 3SA_{OBJ}$ represents a change amount of the third order spherical aberration component in the case of developing a residual aberration of the objective lens into a Zernike's polynomial expression when a refractive index of at least one plastic lens among plastic lenses included in the objective lens fluctuates due to a fluctuation $\Delta T_{OBJ}$ of the ambient temperature of the objective lens, wherein the sign of the third order spherical aberration component is plus (+) when the third order spherical aberration component is over-corrected and is minus (−) when the third order spherical aberration component is under-corrected, $\Delta T_{OBJ}$ is a fluctuation amount of the ambient temperature of the objective lens, and $P_R$ is the total sum of refractive powers of plastic lenses included in the aberration correcting element.

16. The light-converging optical system of claim 15, wherein the objective lens is an objective lens structured by two elements in two groups in which a first lens having a positive refractive power and a second lens having a positive refractive power are arranged in this order from the light source side, and wherein at least one lens including the first lens is a plastic lens.

17. The light-converging optical system of any one of claims 1, 2, 9, and 12, wherein a prescribed image side numerical aperture necessary for recording and/or reproducing the optical information recording medium is 0.8 or more.

18. The light-converging optical system of any one of claims 1, 2, 9, and 12, wherein the light source emits a light flux having a wavelength of 550 nm or less.

19. The light-converging optical system of any one of claims 1, 2, 9, and 12, wherein the objective lens satisfies the following formula:

$|\Delta 3SA_{OBJ}|/|\Delta 5SA_{OBJ}|>1$ where $\Delta 5SA_{OBJ}$ represents a change amount of the fifth order spherical aberration component in the case of developing a residual aberration of the objective lens into a Zernike's polynomial expression when a refractive index of a plastic lens of the objective lens fluctuates by $\Delta N_{OBJ}$ due to a fluctuation $\Delta T_{OBJ}$ of the ambient temperature of the objective lens.

20. The light-converging optical system of claim 19, wherein the objective lens satisfies the following formula:

$|\Delta 3SA_{OBJ}|/|\Delta 5SA_{OBJ}|>3$

21. An optical pickup apparatus for recording and/or reproducing an optical information recording medium, comprising:

a light source and the light converging optical system of any one of claims 1, 2, 9 and 12 for converging a light flux emitted from the light source onto an information recording plane of the optical information recording medium.

22. The optical pickup apparatus of claim 21, further comprising:

an actuator to adjusting changeably a distance between at least two lenses among lenses included in the aberration correcting element in such a way that a spherical aberration generated on each optical surface of the light converging optical system is minimized.

23. An audio and/or image recording apparatus and/or an audio and/or image reproducing apparatus employing the optical pick apparatus of claim 21.

24. An aberration correcting element provided on an optical path between a light source and an objective lens which has a structure of two elements in two groups including a first lens having a positive refractive power and a second lens having a positive refractive power arranged in this order from a light source, wherein at least one lens including the first lens is a plastic lens, comprising:

a positive lens and a negative lens both being a plastic lens and at least one of the positive lens and the negative lens has at least one diffractive surface on which a diffractive structure is formed, wherein the following formulas are satisfied:

$\Delta\theta/\Delta T_{AC}>0$ $P_{\lambda 1}<P_{\lambda 0}<P_{\lambda 2}$, where $\Delta\theta$ is a change amount of an inclination angle of an upper marginal ray of a light flux emitted from the aberration correcting element when the ambient temperature of the aberration correcting element is fluctuated by $\Delta T_{AC}$, where the sign is plus (+) when $\Delta\theta$ changes in a clockwise direction on a basis of an optical axis and is minus (−) when $\Delta\theta$ changes in an anti-clockwise direction, $P_{\lambda 0}$ is the total paraxial power (mm$^{-1}$) of the aberration correcting element with a wavelength of a light flux emitted from the light source, $P_{\lambda 1}$ is the total paraxial power (mm$^{-1}$) of the aberration correcting element with a wavelength shorter by 10 nm than the wavelength of the light flux emitted from the light source, and $P_{\lambda 2}$ is the total paraxial power (mm$^{-1}$) of the aberration correcting element with a wavelength longer by 10 nm than the wavelength of the light flux emitted from the light source.

25. An aberration correcting element provided on an optical path between a light source and an objective lens including at least one plastic lens, comprising:

a positive lens and a negative lens;

wherein the total paraxial power of the aberration correcting element has a temperature dependency satisfying a formula of:

$P_{T1}<P_{T0}<P_{T2}$, or $P_{T1}>P_{T0}>P_{T2}$, where $P_{T0}$ is the total paraxial power (mm$^{-1}$) of the aberration correcting element under the temperature of 25° C., $P_{T1}$ is the total paraxial power (mm$^{-1}$) of the aberration correcting element under the temperature of −5° C., and $P_{T2}$ is the total paraxial power (mm$^{-1}$) of the aberration correcting element under the temperature of 55° C.

26. The aberration correcting element of claim 25, wherein both of the positive lens and the negative lens are a plastic lens and at least one of the positive lens and the negative lens has at least one diffractive structure on which a diffractive structure is formed.

27. The aberration correcting element of claim 25, wherein one of the positive lens and the negative lens is a plastic lens and the other one is a glass lens.

28. An objective lens for use in the light converging optical system of any one of claims 1, 2, 9 and 12, satisfying the following formula:

$|\Delta 3SA_{OBJ}|/|\Delta 5SA_{OBJ}|>3$ where $\Delta 3SA_{OBJ}$ represents a change amount of the third order spherical aberration component in the case of developing a residual aberration of the objective lens into a Zernike's polynomial expression when a refractive index of at least one plastic lens among plastic lenses included in the objective lens fluctuates due to a fluctuation $\Delta T_{OBJ}$ of the ambient temperature of the objective lens, wherein the sign of the third order spherical aberration component is plus (+) when the third order spherical aberration component is over-corrected and is minus (−) when the third order spherical aberration component is under-corrected, and $\Delta 5SA_{OBJ}$ represents a change amount of the fifth order spherical aberration component in the case of developing a residual aberration of the objective lens into a Zernike's polynomial expression when a refractive index of at least one plastic lens among plastic lenses included in the objective lens fluctuates due to a fluctuation $\Delta T_{OBJ}$ of the ambient temperature of the objective lens.

\* \* \* \* \*